(12) United States Patent
Okita et al.

(10) Patent No.: US 9,092,027 B2
(45) Date of Patent: Jul. 28, 2015

(54) CONTROL APPARATUS OF MACHINE TOOL INCLUDING FEED SHAFT MOTOR AND MAIN SPINDLE MOTOR

(71) Applicant: FANUC CORPORATION, Minamitsuru-gun, Yamanashi (JP)

(72) Inventors: Tadashi Okita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 80 days.

(21) Appl. No.: 14/073,393

(22) Filed: Nov. 6, 2013

(65) Prior Publication Data

US 2014/0132194 A1 May 15, 2014

(30) Foreign Application Priority Data

Nov. 9, 2012 (JP) ................................. 2012-247348

(51) Int. Cl.
*G05B 19/18* (2006.01)
*G05B 19/4062* (2006.01)

(52) U.S. Cl.
CPC .................................. *G05B 19/4062* (2013.01)

(58) Field of Classification Search
CPC ................................................ G05B 19/4062
USPC ......... 318/560, 561, 569, 570, 571, 625, 685, 318/690, 691, 112, 400.01, 400.09, 400.14, 318/400.15, 700, 701, 721, 727, 799, 800, 318/801, 805, 259, 260, 262, 263, 276, 318/504; 388/800, 815, 822, 937; 483/16, 483/17, 28, 30

See application file for complete search history.

(56) References Cited

U.S. PATENT DOCUMENTS

2008/0218116 A1 * 9/2008 Maeda et al. ................ 318/571

FOREIGN PATENT DOCUMENTS

| CN | 1187886 C | 2/2005 |
|---|---|---|
| CN | 102205512 A | 10/2011 |
| JP | 07-143780 A | 6/1995 |
| JP | 7239706 A | 9/1995 |
| JP | 10-271866 A | 10/1998 |
| JP | 2000188897 A | 7/2000 |
| JP | 200522321 A | 1/2005 |

* cited by examiner

*Primary Examiner* — Antony M Paul
(74) *Attorney, Agent, or Firm* — Lowe Hauptman & Ham, LLP

(57) ABSTRACT

A control apparatus includes a converter for converting an AC voltage to a DC voltage, a feed shaft motor inverter for converting the DC voltage to an AC voltage for a feed shaft motor, a main spindle motor inverter for converting the DC voltage to an AC voltage for a main spindle motor, a power outage detection unit for detecting a power outage of the AC power supply, a voltage detection unit for detecting the DC voltage, and a control unit which, upon power outage of the AC power supply side, outputs a feed shaft motor deceleration command to the feed shaft motor inverter and outputs, to the main spindle motor inverter, a main spindle motor acceleration command when a DC voltage is greater than an upper limit and a main spindle motor deceleration command when the DC voltage is less than a lower limit.

14 Claims, 14 Drawing Sheets

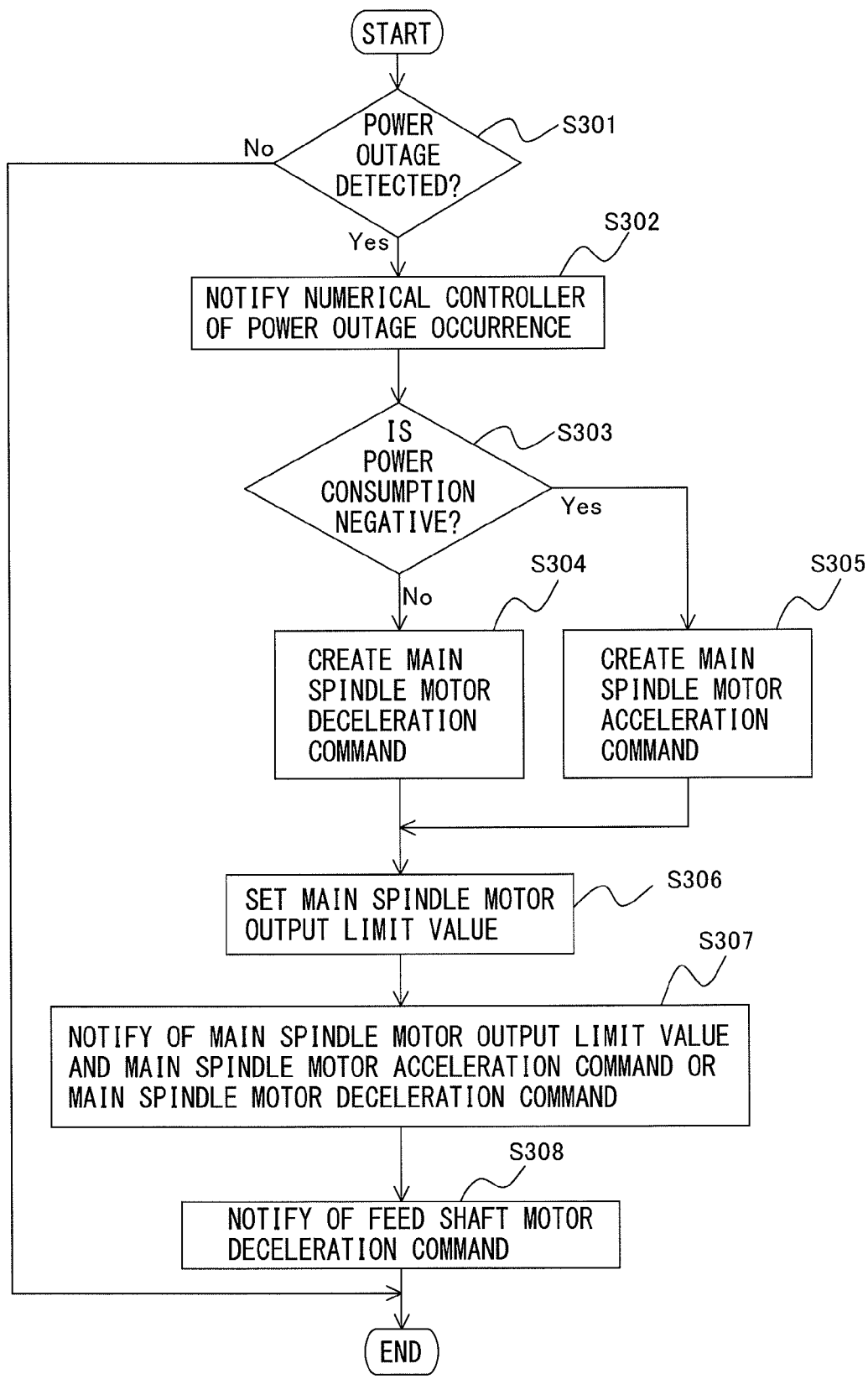

CONTROL APPARATUS OF MACHINE TOOL INCLUDING FEED SHAFT MOTOR AND MAIN SPINDLE MOTOR

RELATED APPLICATIONS

The present application is based on and claims priority to Japanese Application Number 2012-247348, filed Nov. 9, 2012, the disclosure of which is hereby incorporated by reference herein in its entirety.

BACKGROUND OF THE INVENTION

1. Field of the Invention

The present invention relates to a control apparatus of a machine tool including a feed shaft motor for driving a feed shaft and a main spindle motor for driving a main spindle and in particular relates to the control apparatus of the machine tool in which AC supplied from an AC power supply side is converted to output DC which is again converted to AC for driving the motors, which is supplied to drive the feed shaft motor and the main spindle motor.

2. Description of the Related Art

In a machine tool including a feed shaft motor for driving a feed shaft and a main spindle motor for driving a main spindle, DC power temporarily converted from AC power inputted from an AC input side is again converted to AC power and the AC power is used as driving power for motors mounted on each driving shaft. Such a machine tool comprises: as a main circuit of a motor control apparatus, a converter for outputting a DC voltage by rectifying an AC voltage supplied from an AC power supply side including a three-phase AC input power supply; and an inverter, which is connected to a DC link (direct current link) being a DC side of the converter, for performing a bi-directional power conversion between DC power of the DC link and AC power which is driving power for the motors or regenerative power, and the machine tool controls speed, torque, or a position of a rotor of a main spindle motor and a feed shaft motor connected to an AC output side of the inverter.

The inverter among them is provided for each motor driving each of a plurality of drive shafts.

In recent years, in response to demands for energy conservation, inverters capable of regenerating power are often used for reusing, as driving power of motors, regenerative power generated during deceleration of the motors by storing it in a storage device provided in the DC link and for further restoring the regenerative power to the AC power supply side.

On the other hand, with regard to the converter, one converter corresponding to a plurality of inverters is often provided in order to reduce the cost of and the space occupied by the motor control apparatus in the machine tool. Furthermore, similarly to the aforementioned inverters, there are also cases where converters capable of regenerating power are used in response to demands for energy conservation, the converters being capable of restoring regenerative energy generated during deceleration of motors to the AC power supply side.

When a power outage occurs at the AC power supply side, the aforementioned motor control apparatus becomes unable to continue the normal operation of the feed shaft motor and the main spindle motor. In such a case, it is required to stop the operation of the feed shaft motor driving a feed shaft as soon as possible to prevent a collision of the feed shaft. For this reason, when a power outage occurs at the AC power supply side, it is implemented that a tool connected to the feed shaft motor, a workpiece machined by the tool, and the like are protected by issuing a deceleration command to the feed shaft motor to stop in conjunction with a detection of a power outage. In a case that the power supply of a control apparatus (a computer unit) is backed up by an uninterruptible power supply (UPS), the control apparatus can instruct a feed shaft motor inverter action to be taken in case of emergency even when a power outage occurs at the AC power supply side, and it can be controlled in such a way that the feed shaft motor inverter is operable for a while with charges stored in capacitors provided in a converter (a rectifier) and the feed shaft motor is urgently stopped.

For example, a method in which an early halt of a motor is realized by actively generating reverse torque during deceleration of the motor as described in Japanese Laid-open Patent Publication No. H07-143780 has been proposed as a method of urgently halting the motor upon a power outage at the AC power supply side.

However, if a technique as described in Japanese Laid-open Patent Publication No. H07-143780 and the like, for example, in which an emergency halt is carried out by providing a deceleration command to a feed shaft motor in conjunction with a detection of a power outage at the AC power supply side, was applied to a motor drive apparatus having a function of regenerating to the AC power supply side regenerative power generated during deceleration of the motor, the regenerative power could not be restored to the AC power supply side during a power outage and, hence, a DC voltage at a DC link between a converter and an inverter would increase. In particular, it is significant when the regenerative power of a motor is large. Usually, an inverter issues an "overvoltage alarm" to protect the inverter itself and aborts control when the DC voltage at the DC link being the DC side thereof increases excessively. In this case, an emergency halt such as halting the motor by actively generating reverse torque during deceleration is difficult to be performed, and hence a problem arises that it takes time from an occurrence of a power outage at the AC power supply side till a halt of the motor. If such a problem arose, for example, in the aforementioned case of the feed shaft motor, a collision of a feed shaft could not be prevented.

Depending on characteristics of a feed shaft motor and a situation of frictions received by a feed shaft driven by the feed shaft motor, it may be required to continue supplying drive power from a feed shaft motor inverter to the feed shaft motor even when the feed shaft motor is to be decelerated. In other words, in this case, since regenerative power is not generated in the feed shaft motor even during deceleration of the feed shaft motor, the feed shaft motor inverter does not provide energy to the DC link, but conversely the feed shaft motor inverter converts DC power of the DC link to AC power to supply to the feed shaft motor. In this situation, when a deceleration command is provided for an emergency halt as described above upon an occurrence of a power outage at the AC power supply side, the DC voltage of the DC link drops rapidly. Usually, when the DC voltage at the DC link being the DC side thereof drops excessively, an inverter is difficult to supply driving power, therefore the inverter issues a "low voltage alarm" and aborts control. In this case, an emergency halt such as halting the motor by actively generating reverse torque during deceleration is difficult be performed, and hence a problem arises that it takes time from an occurrence of a power outage at the AC power supply side till a halt of the motor. If such a problem arose, for example, in the aforementioned case of the feed shaft motor, a collision of the feed shaft could not be prevented.

SUMMARY OF THE INVENTION

In view of the above problems, an object of the present invention is to provide a control apparatus of a machine tool in which, in the machine tool including a feed shaft motor for driving a feed shaft and a main spindle motor for driving a main spindle, the feed shaft motor can be halted reliably and early upon an occurrence of a power outage at the AC power supply side.

In order to realize the aforementioned object, in a first aspect, a control apparatus of a machine tool including a feed shaft motor for driving a feed shaft and a main spindle motor for driving a main spindle includes a converter for performing a bi-directional power conversion between an AC voltage of an AC power supply side and a DC voltage at a DC link being a DC side, a feed shaft motor inverter for performing a bi-directional power conversion between the DC voltage at the DC link and an AC voltage of the feed shaft motor side to supply drive power to the feed shaft motor, a main spindle motor inverter for performing a bi-directional power conversion between the DC voltage at the DC link and an AC voltage of the main spindle motor side to supply drive power to the main spindle motor, a power outage detection unit for detecting an occurrence and non-occurrence of the power outage of the AC power supply side of the converter, a voltage detection unit for detecting the DC voltage at the DC link, and a control unit for outputting a feed shaft motor deceleration command for controlling the feed shaft motor inverter to decelerate the feed shaft motor upon detection of the power outage by the power outage detection unit, wherein, upon detection of the power outage by the power outage detection unit, the control unit outputs a main spindle motor acceleration command for controlling the main spindle motor inverter to accelerate the main spindle motor when a DC voltage detected by the voltage detection unit is greater than a predetermined upper limit value and a main spindle motor deceleration command for controlling the main spindle motor inverter to decelerate the main spindle motor when the DC voltage detected by the voltage detection unit is less than a predetermined lower limit value which is lower than the predetermined upper limit value.

Upon detection of the power outage by the power outage detection unit, the control unit outputs a main spindle motor power cutoff command for controlling the main spindle motor inverter to halt a supply of drive power to the main spindle motor when the DC voltage detected by the voltage detection unit is greater than or equal to the predetermined lower limit value and is less than or equal to the predetermined upper limit value.

In a second aspect, a control apparatus of a machine tool including a feed shaft motor for driving a feed shaft and a main spindle motor for driving a main spindle includes a converter for performing a bi-directional power conversion between an AC voltage of an AC power supply side and a DC voltage at a DC link being a DC side, a feed shaft motor inverter for performing a bi-directional power conversion between the DC voltage at the DC link and an AC voltage of the feed shaft motor side to supply drive power to the feed shaft motor; a main spindle motor inverter for performing a bi-directional power conversion between the DC voltage at the DC link and an AC voltage of the main spindle motor side to supply drive power to the main spindle motor, a power outage detection unit for detecting an occurrence and non-occurrence of a power outage of the AC power supply side of the converter, a power calculation unit for calculating a power consumption in the feed shaft motor; and a control unit for outputting a feed shaft motor deceleration command for controlling the feed shaft motor inverter to decelerate the feed shaft motor upon detection of the power outage by the power outage detection unit, wherein, upon detection of the power outage by the power outage detection unit, the control unit outputs a main spindle motor acceleration command for controlling the main spindle motor inverter to accelerate the main spindle motor when the power consumption calculated by the power calculation unit is negative and a main spindle motor deceleration command for controlling the main spindle motor inverter to decelerate the main spindle motor when the power consumption calculated by the power calculation unit is positive.

In the second aspect, the control unit outputs, as a main spindle motor output limit value, the power consumption calculated by the power calculation unit and the main spindle motor inverter may perform the bi-directional power conversion between the DC voltage at the DC link and the AC voltage of the main spindle motor side based on the main spindle motor acceleration command or the main spindle motor deceleration command until a total amount of AC power generated by the bi-direction power conversion of the main spindle motor inverter based on the main spindle motor acceleration command or the main spindle motor deceleration command reaches the main spindle motor output limit value.

Furthermore, in the second aspect, when the feed shaft motor inverter is provided at least for each feed shaft motor, the power consumption being calculated by the power calculation unit is obtained by summing power consumption in all feed shaft motors.

In the first and second aspects, the main spindle motor acceleration command may include, as a speed command upper limit value, the main spindle motor acceleration command at a time when a maximum rotational speed or a maximum number of rotations allowed for the main spindle motor is reached.

When a main spindle for being driven by the main spindle motor is a shaft which holds to rotate a workpiece, the speed command upper limit value may be set according to a type of the workpiece being held by the main spindle.

Furthermore, in the first and second aspects, with a rotational speed of the main spindle motor at a time when the power outage detection unit detects the power outage as a reference, an increase of the main spindle motor acceleration command corresponding to a maximum allowable increase from the rotational speed is set as a speed command increase allowable value and the main spindle motor acceleration command may include, as a speed command upper limit value, a value obtained by adding the speed command increase allowable value to the rotational speed of the main spindle motor at a time when the power outage detection unit detects the power outage.

When a main spindle for being driven by the main spindle motor is a shaft which holds to rotate a workpiece, the speed command increase allowable value may be set according to the workpiece being held by the main spindle.

Furthermore, when the feed shaft motor deceleration command is outputted to the feed shaft motor inverter and the main spindle motor acceleration command is outputted to the main spindle motor inverter upon detection of the power outage by the power outage detection unit, the control unit may output a feed shaft motor torque limit command for controlling the feed shaft motor inverter to decrease torque of the feed shaft motor from a current one when the main spindle motor acceleration command reaches the speed command upper limit value.

Furthermore, upon detection of the power outage by the power outage detection unit, the control unit may be configured not to output the main spindle motor acceleration command or the main spindle motor deceleration command to the main spindle motor inverter when a position control of the main spindle is being performed.

Furthermore, the control apparatus of the machine tool preferably includes a power supply backup unit to supply power to the control unit for operating the control unit even when the power detection unit detects the power outage.

Furthermore, it is preferable to configure so that a communication unit communicatably connected to each other among a converter controller provided in the converter, a feed shaft motor inverter controller provided in the feed shaft motor inverter, a main spindle motor inverter controller provided in the main spindle motor inverter, and the control unit is provided and the power outage detection unit notifies the converter controller and the control unit via the communication unit of a detection result indicating an occurrence and non-occurrence of the power outage of the AC power supply side of the converter.

BRIEF DESCRIPTION OF THE DRAWINGS

The present invention will be understood more clearly by reference to the following accompanying drawings, in which:

FIG. 7 is a flowchart illustrating an operational flow of a control apparatus of a machine tool according to a third embodiment;

DETAILED DESCRIPTION OF THE INVENTION

Hereinafter, a control apparatus of a machine tool including a feed shaft motor and a main spindle motor is explained with reference to drawings. However, it is to be understood that the present invention is not limited to the drawings or embodiments described in the following.

Figure 1:
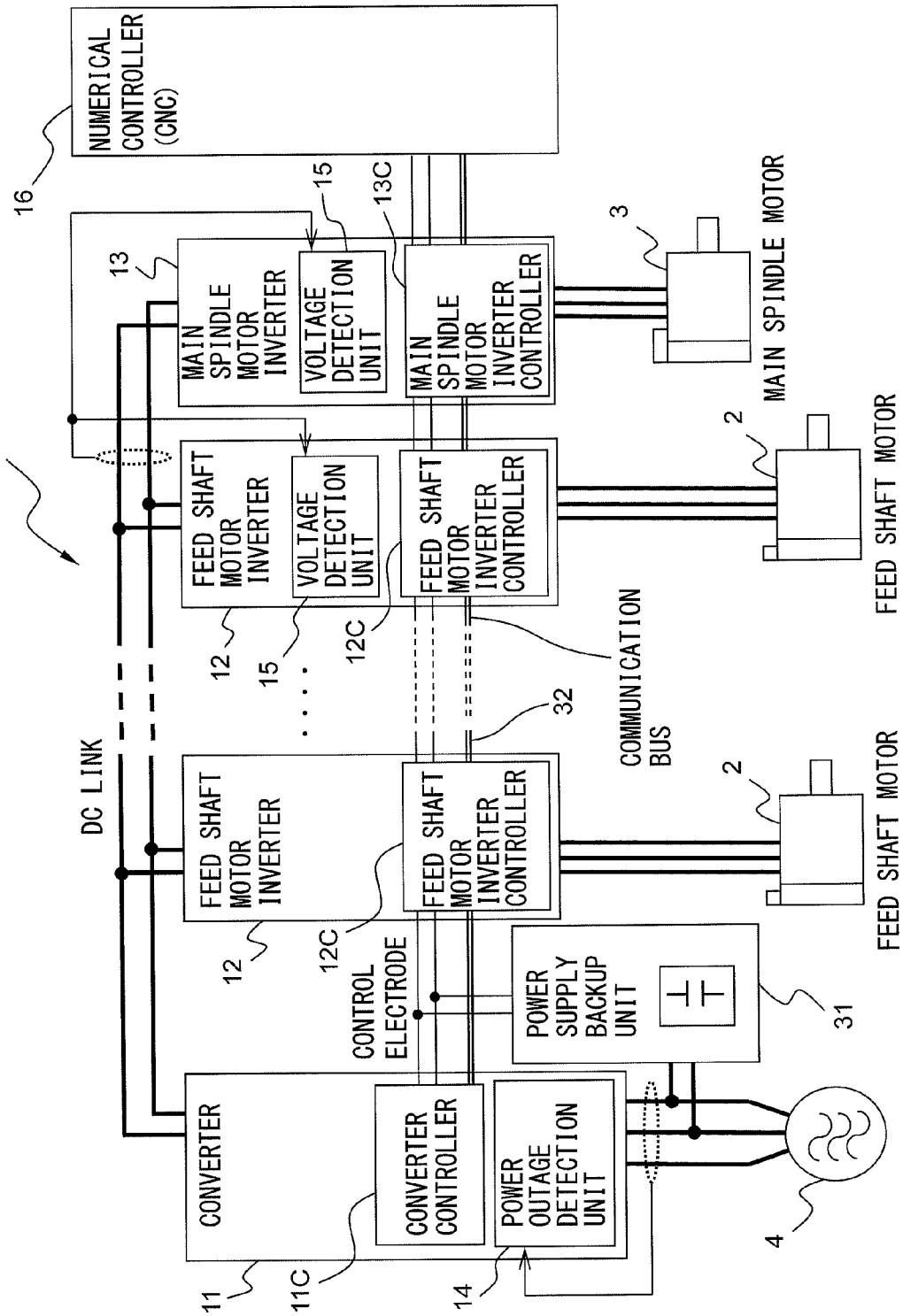
FIG. 1 is a block diagram illustrating a control apparatus of a machine tool according to a first embodiment.

FIG. 1 is a block diagram illustrating a control apparatus of a machine tool according to a first embodiment. Hereinafter, those denoted by the same reference symbol in different drawings are meant to be components having the same function.

According to the first embodiment, a control apparatus 100 of a machine tool including a feed shaft motor 2 for driving a feed shaft and a main spindle motor 3 for driving a main spindle includes a converter 11, a feed shaft motor inverter 12, a main spindle motor inverter 13, a power outage detection unit 14, a voltage detection unit 15, a numerical controller (CNC) 16 as a control unit, a power supply backup unit 31, and a communication bus 32 as a communication unit.

The converter 11, the feed shaft motor inverter 12, and the main spindle motor inverter 13 are connected via a DC link. The communication bus 32, which is the communication unit, has a function to communicatably connect to each other among a converter controller 11C provided in the converter 11, a feed shaft motor inverter controller 12C provided in the feed shaft motor inverter 12, a main spindle motor inverter controller 13C provided in the main spindle motor inverter 13, and the numerical controller 16. Note that such a communication unit may be realized by a wireless system instead of a wired system such as the communication bus 32.

The converter 11 is a rectifier which rectifies AC power supplied by a commercial three-phase AC power supply 4 to output DC power during powering and can regenerate regenerative energy regenerated by a motor to the AC power supply 4 side via the DC link during a regenerative operation. In other words, the converter 11 performs a bi-directional power conversion between an AC voltage of the commercial three-phase AC power supply 4 side and a DC voltage at the DC link being the DC side. Examples of the converter 11 include a 120 degree conductive rectifying circuit, a rectifying circuit of a PWM control scheme, and the like.

The feed shaft motor inverter 12 includes a conversion circuit (not shown) having switching elements in its inside such as, for example, an PWM inverter and the feed shaft motor inverter controller 12C which controls the conversion circuit. In the feed shaft motor inverter 12, based on a motor drive command received from the numerical controller 16 via the communication bus 32, the feed shaft motor inverter controller 12C performs switching operations of the switching elements inside the conversion circuit to convert the DC power supplied from the DC link side to three-phase AC power of a desired voltage and a desired frequency for driving the feed shaft motor 2. The feed shaft motor 2 is to operate based on the supplied three-phase AC power with a variable voltage and a variable frequency. Regenerative power is generated during deceleration of the feed shaft motor 2 and the feed shaft motor inverter controller 12C performs, based on the motor drive command received from the numerical controller 16 via the communication bus 32, switching operations of the switching elements inside the conversion circuit to convert AC power, which is regenerative power generated in the feed shaft motor 2, to DC power, which is restored to the DC link. Thus, the feed shaft motor inverter 12 performs a bi-directional power conversion between DC power in the DC link and drive power of the feed shaft motor 2 or AC power being regenerative power.

The main spindle motor inverter 13 includes a conversion circuit (not shown) having switching elements in its inside such as, for example, an PWM inverter and the main spindle motor inverter controller 13C which controls the conversion circuit. In the main spindle motor inverter 13, based on a motor drive command received from the numerical controller 16 via the communication bus 32, the main spindle motor inverter controller 13C performs switching operations of the switching elements inside the conversion circuit to convert the DC power supplied from the DC link side to three-phase AC power of a desired voltage and a desired frequency for driving the main spindle motor 3. The main spindle motor 3 is to operate based on the supplied three-phase AC power with a variable voltage and a variable frequency. Regenerative power is generated during deceleration of the main spindle motor 3 and the main spindle motor inverter controller 13C performs, based on the motor drive command received from the numerical controller 16 via the communication bus 32, switching operations of the switching elements inside the conversion circuit to convert AC power, which is regenerative power generated in the main spindle motor 3, to DC power, which is restored to the DC link. Thus, the main spindle motor inverter 13 performs a bi-directional power conversion between DC power in the DC link and drive power of the main spindle motor 3 or AC power being regenerative power.

The power outage detection unit 14 is provided inside the converter 11 and detects an occurrence and non-occurrence of a power outage at the AC power supply side of the converter 11. The power outage detection unit 14 notifies the converter controller 11C and the numerical controller 16 via the communication bus 32 of a detection result indicating an occurrence and non-occurrence the power outage at the AC power supply side of the converter 11.

The voltage detection unit 15 is provided inside the feed shaft motor inverter 12 or the main spindle motor inverter 13 and detects the DC voltage at the DC link to notify the numerical controller 16 via the communication bus 32.

The numerical controller 16 creates to output a command for controlling the feed shaft motor inverter 12 and the main spindle motor inverter 13 in order to drive the feed shaft motor 2 and the main spindle motor 3 at desired rotational speed and torque. When received a notification from the power outage detection unit 14 via the communication bus 32 that a power outage has occurred at the AC power supply side, the numerical controller 16 outputs a feed shaft motor deceleration command for controlling the feed shaft motor inverter 12 to decelerate the feed shaft motor 2. At this time, when the DC voltage notified via the communication bus 32 is greater than a predetermined upper limit value, a main spindle motor acceleration command is outputted to control the main spindle motor inverter 13 to accelerate the main spindle motor, when the DC voltage notified via the communication bus 32 is less than a predetermined lower limit value which is lower than the predetermined upper limit value, a main spindle motor deceleration command is outputted to control the main spindle motor inverter 13 to decelerate the main spindle motor 3, and when the DC voltage notified via the communication bus 32 is greater than or equal to the predetermined lower limit value and is less than or equal to the predetermined upper limit value, a main spindle motor power cutoff command is outputted to control the main spindle motor inverter 13 to cut off supplying the drive power to the main spindle motor 3.

The numerical controller 16 is configured to receive a supply of power for operation from the commercial three-phase AC power supply 4 of the converter 11 in a normal circumstance, but a supply of power is difficult to be received when a power outage occurs at the AC power supply side of the converter 11, therefore, in order to realize the aforementioned operation of the numerical controller 16, the numerical controller 16 includes a power supply backup unit 31 which supplies to the numerical controller 16 power for operating the numerical controller 16 even when the power outage detection unit 14 has detected a power outage.

Figure 2:
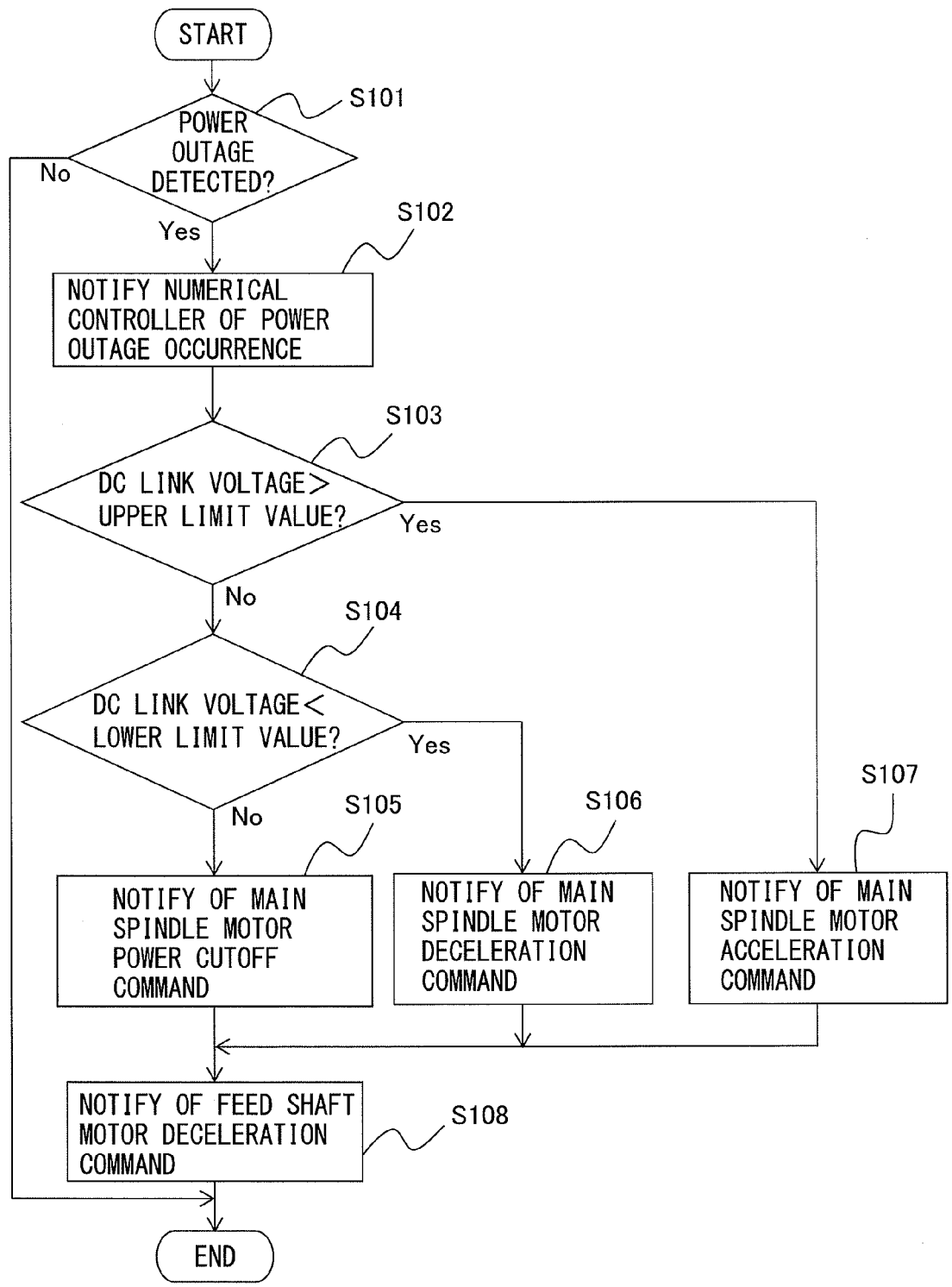
FIG. 2 is a flowchart illustrating an operational flow of the control apparatus of the machine tool according to the first embodiment.

FIG. 2 is a flowchart illustrating an operational flow of the control apparatus of the machine tool according to the first embodiment.

At step S101, the power outage detection unit 14 inside the converter 11 detects an occurrence and non-occurrence of a power outage at the AC power supply side of the converter 11. When the power outage detection unit 14 detects an occurrence of a power outage at step S101, step S102 is proceeded to.

At step S102, the power outage detection unit 14 notifies the converter controller 11C and the numerical controller 16 via the communication bus 32 of the fact that a power outage has occurred at the AC power supply side of the converter 11.

At step S103, the numerical controller 16 determines whether or not the DC voltage at the DC link notified via the communication bus 32 is greater than the predetermined upper limit value. When the DC voltage at the DC link notified via the communication bus 32 is less than or equal to the predetermined upper limit value, step S104 is proceeded to and when it is greater than the upper limit value, step S107 is proceeded to.

At step S107, the numerical controller 16 outputs the main spindle motor acceleration command which controls the main spindle motor inverter 13 to accelerate the main spindle motor 3. The main spindle motor acceleration command outputted from the numerical controller 16 is transmitted to the main spindle motor inverter controller 13C via the communication bus 32. Upon receiving the main spindle motor acceleration command, the main spindle motor inverter controller 13C makes the switching elements inside the conversion circuit to perform switching operations to convert to the three-phase AC power of a desired voltage and a desired frequency to accelerate the main spindle motor 3. The main spindle motor 3 is to be accelerated based on the supplied three-phase AC power of a variable voltage and a variable frequency. In this case, since the DC voltage at the DC link becomes greater than the predetermined upper limit value and is likely to approach the overvoltage alarm level of the DC link upon an occurrence of a power outage, the main spindle motor 3 is rotated at a higher speed so that the DC power at the DC link is consumed by the main spindle motor 3. If the aforementioned predetermined value is set to be a value less than the overvoltage alarm level, the aforementioned operation is executed, and hence the energy is consumed in the main spindle motor 3 and the overvoltage alarm level will not be reached.

On the other hand, at step S104, the numerical controller 16 determines whether or not the DC voltage at the DC link notified via the communication bus 32 is less than the predetermined lower limit value. When the DC voltage at the DC link notified via the communication bus 32 is greater than the predetermined lower limit value, step S105 is proceeded to and when it is less than or equal to the lower limit value, step S106 is proceeded to.

At step S106, the numerical controller 16 outputs the main spindle motor deceleration command which controls the main spindle motor inverter 13 to decelerate the main spindle motor 3. The main spindle motor deceleration command outputted from the numerical controller 16 is transmitted to the main spindle motor inverter controller 13C via the communication bus 32. Upon receiving the main spindle motor deceleration command, the main spindle motor inverter controller 13C makes the switching elements inside the conversion circuit to perform switching operations to convert to the three-phase AC power of a desired voltage and a desired frequency for decelerating the main spindle motor 3. The main spindle motor 3 is to be decelerated based on the supplied three-phase AC power of a variable voltage and a variable frequency. In this case, since the DC voltage at the DC link becomes less than the predetermined lower limit value and is likely to approach the low voltage alarm level of the DC link upon an occurrence of a power outage, the DC link voltage is maintained with regenerative energy due to deceleration of the main spindle motor 3. If the aforementioned predetermined value is set to be a value greater than the low voltage alarm level, the aforementioned operation is executed, and hence the regenerative power generated due to deceleration of the main spindle motor 3 is converted to the DC power by the main spindle motor inverter 13 to supply to the DC link, which causes the DC voltage value of the DC link to increase, hence, the low voltage alarm level will not be reached.

At step S105, the numerical controller 16 outputs the main spindle motor power cutoff command to control the main spindle motor inverter 13 to stop supply of the drive power to the main spindle motor 3.

At step S108, the feed shaft motor deceleration command is outputted which controls the feed shaft motor inverter 12 to decelerate the feed shaft motor 2. The feed shaft motor deceleration command outputted from the numerical controller 16 is transmitted to the feed shaft motor inverter controller 12C via the communication bus 32. Upon receiving the feed shaft motor deceleration command, the feed shaft motor inverter controller 12C makes the switching elements inside the conversion circuit to perform switching operations to convert to the three-phase AC power of a desired voltage and a desired frequency for decelerating the feed shaft motor 2. The feed shaft motor 2 is to be decelerated based on the supplied three-phase AC power of a variable voltage and a variable frequency.

Upon completion of processing of step S108, processing of step S101 is resumed. In other words, by repeatedly executing the processes of steps S101 to S108, the numerical controller 16 outputs the feed shaft motor deceleration command and also outputs either the main spindle motor deceleration command, the main spindle motor acceleration command, or the main spindle motor power cutoff command according to a comparison result between the DC voltage of the DC link notified via the communication bus 32 and the predetermined upper limit value and the predetermined lower limit value.

Figure 3:
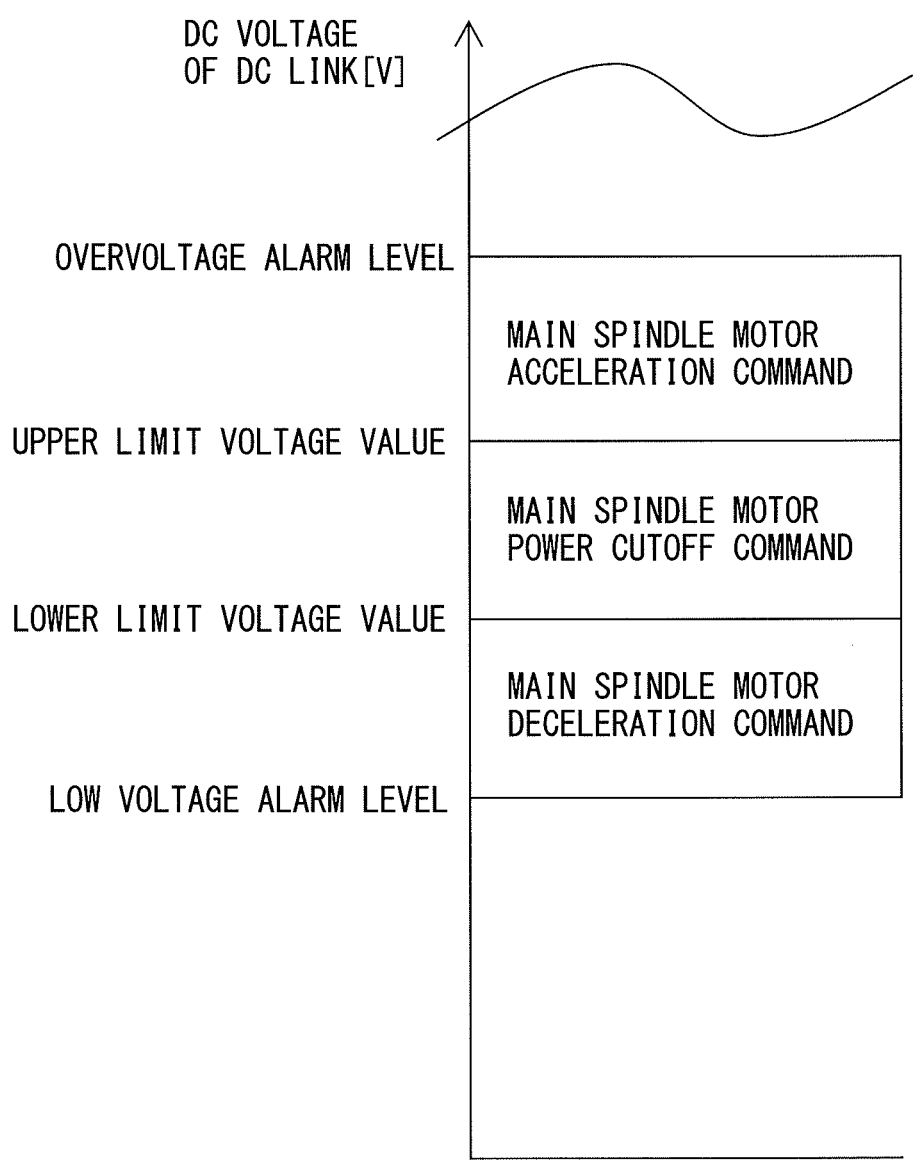
FIG. 3 is a diagram explaining a command to be notified to a spindle motor inverter during a power outage according to the first embodiment.

FIG. 3 is a diagram explaining a command to be notified to the main spindle motor inverter during a power outage according to the first embodiment. As described above, upon an occurrence of a power outage at the AC power supply side, the numerical controller 16 transmits the feed shaft motor deceleration command to the feed shaft motor inverter 12, but a command to be transmitted to the main spindle motor inverter 13 is different depending on a level of the DC voltage at the DC link notified via the communication bus 32. In other words, when the DC voltage at the DC link notified via the communication bus 32 is greater than the predetermined upper limit value, the main spindle motor acceleration command is transmitted, which causes the main spindle motor 3 to be accelerated to consume an increase of the DC power at the DC link which is a cause of an increase of the DC voltage at the DC link, and hence an increase of the DC power at the DC link is suppressed and reaching the overvoltage alarm level is avoided. When the DC voltage at the DC link notified via the communication bus 32 is less than the predetermined lower limit value, the main spindle motor deceleration command is transmitted, which leads to that a decrease of the DC power at the DC link which is a cause of a decrease of the DC voltage at the DC link is offset with the regenerative power generated by decelerating the main spindle motor 3, and hence a decrease of the DC power at the DC link is suppressed and reaching the low voltage alarm level is avoided. When the DC voltage at the DC link notified via the communication bus 32 is greater than or equal to the predetermined lower limit value and is less than or equal to the predetermined upper limit value, the main spindle motor power cutoff command is transmitted and power being supplied to the main spindle motor 3 is cut off, which is in response to a power outage.

Figure 4:
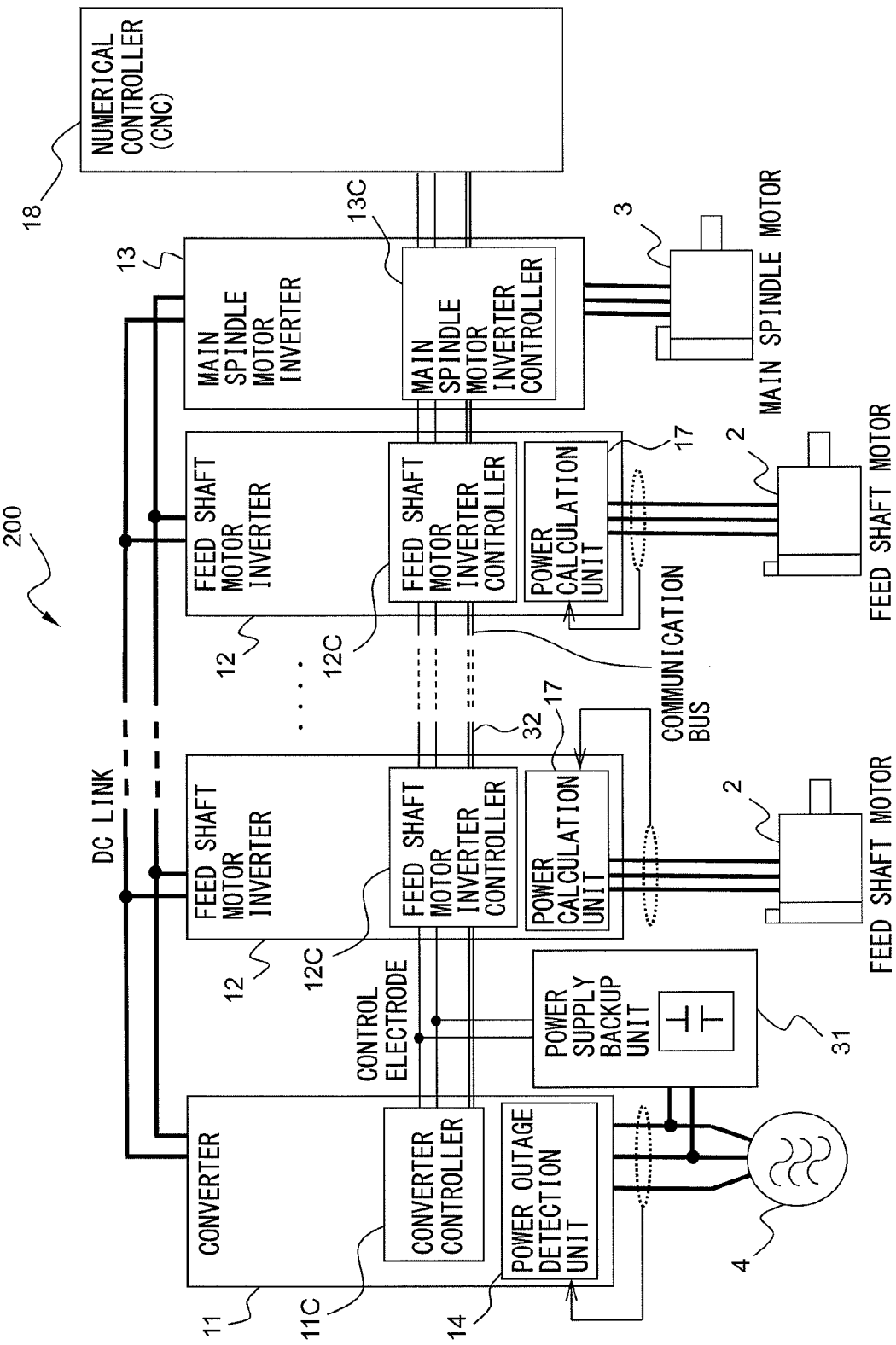
FIG. 4 is a block diagram illustrating a control apparatus of a machine tool according to a second embodiment.

FIG. 4 is a block diagram illustrating a control apparatus of a machine tool according to a second embodiment.

According to the second embodiment, a control apparatus 200 of a machine tool having the feed shaft motor 2 for driving the feed shaft and the main spindle motor 3 for driving the main spindle includes the converter 11, the feed shaft motor inverter 12, the main spindle motor inverter 13, the power outage detection unit 14, a power calculation unit 17, a numerical controller 18 as a control unit, the power supply backup unit 31, and the communication bus 32 as a communication unit.

Explanation of the converter 11, the feed shaft motor inverter 12, the main spindle motor inverter 13, the power outage detection unit 14, and the power supply backup unit 31 is omitted since they are similar to those of the first embodiment explained with reference to FIG. 1 and FIG. 2.

The power calculation unit 17 is provided inside the feed shaft motor inverter 12 and calculates, based on an AC voltage and an AC current of the AC output side of the feed shaft motor inverter 12, the power consumption in the feed shaft motor 2 connected to the feed shaft motor inverter 12. The power calculation unit 17 notifies the feed shaft motor inverter controller 12C and the numerical controller 18 via the communication bus 32 of the calculated value of the power consumption of the feed shaft motor 2. The numerical controller 18 utilizes the received value of the power consumption in the process described below. Note that when a plurality of feed shaft motors 2 exist, the numerical controller 18 utilizes the total of power consumptions calculated by each power calculation unit 17 (i.e. the total power consumption in all feed shaft motors 2) in the process described below.

The numerical controller (CNC) 18 creates to output a command for controlling the feed shaft motor inverter 12 and the main spindle motor inverter 13 in order to drive the feed shaft motor 2 and the main spindle motor 3 at desired rotational speed and torque. Upon receipt of a notification from the power outage detection unit 14 via the communication bus 32 that a power outage has occurred at the AC power supply side, the numerical controller 18 outputs the feed shaft motor deceleration command for controlling the feed shaft motor inverter 12 to decelerate the feed shaft motor 2. At this time, when the power consumption calculated by the power calculation unit 17 is negative, the main spindle motor acceleration command for controlling the main spindle motor inverter 13 is outputted to accelerate the main spindle motor 3 and when the power consumption calculated by the power calculation unit 17 is positive, the main spindle motor deceleration command for controlling the main spindle motor inverter 13 is outputted to decelerate the main spindle motor 3.

Figure 5:
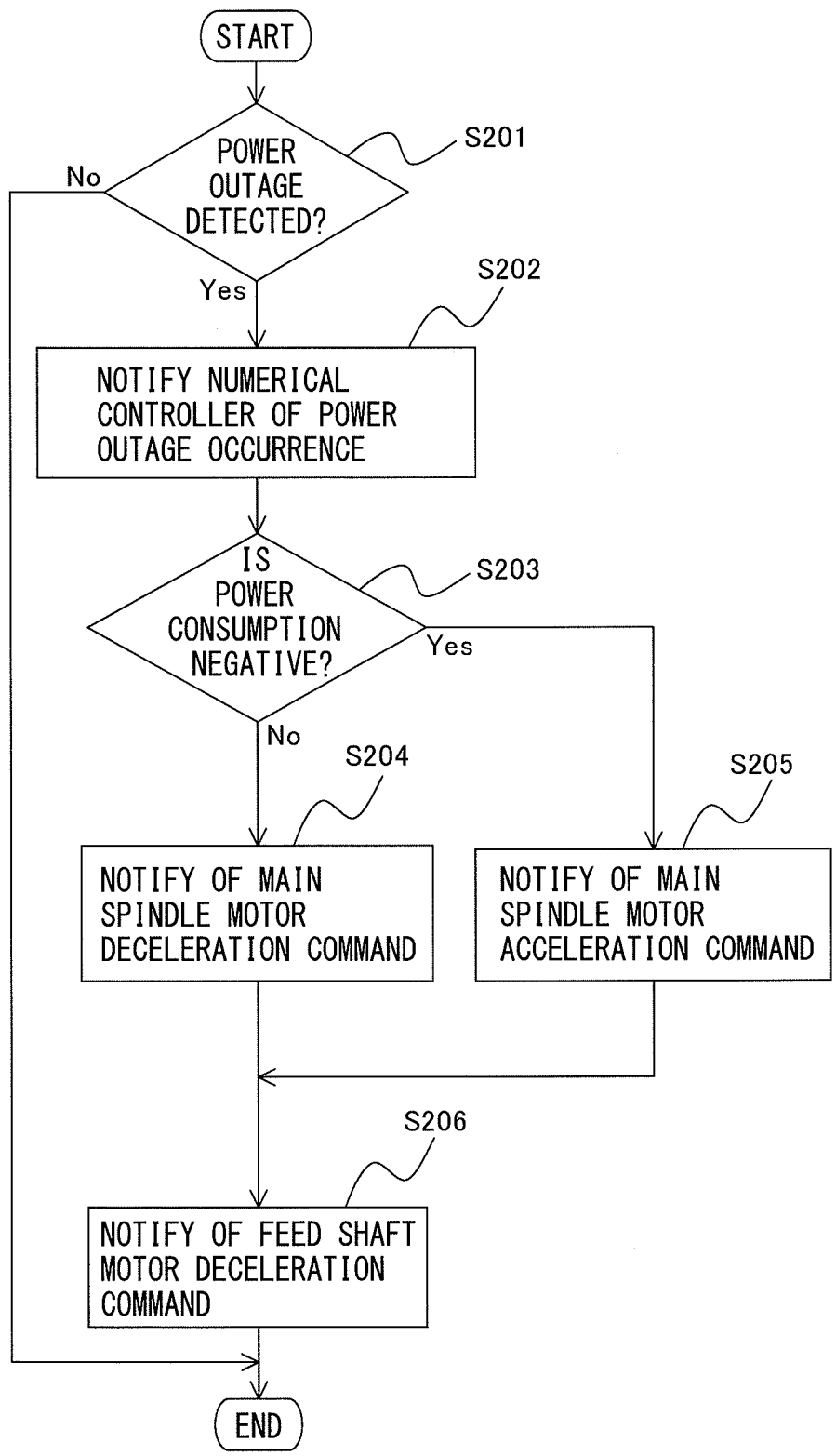
FIG. 5 is a flowchart illustrating an operational flow of the control apparatus of the machine tool according to the second embodiment.

FIG. 5 is a flowchart illustrating an operational flow of the control apparatus of the machine tool according to the second embodiment.

At step S201, the power outage detection unit 14 inside the converter 11 detects an occurrence and non-occurrence of a power outage at the AC power supply side of the converter 11.

When the power outage detection unit 14 detects an occurrence of a power outage at step S201, step S202 is proceeded to.

At step S202, the power outage detection unit 14 notifies the converter controller 11C and the numerical controller 18 via the communication bus 32 of the fact that a power outage has occurred at the AC power supply side of the converter 11.

At step S203, the numerical controller 18 determines whether the power consumption of the feed shaft motor 2 calculated by the power calculation unit 17 is negative or positive. When the power consumption calculated by the power calculation unit 17 is positive, step S204 is proceeded to and when it is negative, step S205 is proceeded to.

At step S204, the numerical controller 18 outputs the main spindle motor deceleration command for controlling the main spindle motor inverter 13 to decelerate the main spindle motor 3. The main spindle motor deceleration command outputted by the numerical controller 18 is transmitted to the main spindle motor inverter controller 13C via the communication bus 32. Upon receipt of the main spindle motor deceleration command, the main spindle motor inverter controller 13C performs switching operations of the switching elements inside the conversion circuit to convert to the three-phase AC power of a desired voltage and a desired frequency for decelerating the main spindle motor 3. The main spindle motor 3 is to be decelerated based on the supplied three-phase AC power of a variable voltage and a variable frequency. The fact that the power consumption of the feed shaft motor 2 is determined to be positive at step S203 means that energy is consumed in the feed shaft motor 2, which leads to a further decrease of the DC voltage of the DC link if such a situation is left as it is. Thus, by executing the process of step S204, energy consumed by the main spindle motor 3 is reduced due to deceleration of the main spindle motor 3, which suppresses a decrease of the DC voltage of the DC link.

At step S205, the numerical controller 18 outputs the main spindle motor acceleration command for controlling the main spindle motor inverter 13 to accelerate the main spindle motor 3. The main spindle motor acceleration command outputted by the numerical controller 18 is transmitted to the main spindle motor inverter controller 13C via the communication bus 32. Upon receipt of the main spindle motor acceleration command, the main spindle motor inverter controller 13C performs switching operations of the switching elements inside the conversion circuit to convert to the three-phase AC power of a desired voltage and a desired frequency to accelerate the main spindle motor 3. The main spindle motor 3 is to be accelerated based on the supplied three-phase AC power of a variable voltage and a variable frequency. The fact that the power consumption of the feed shaft motor 2 is determined to be negative at step S203 means that energy is regenerated in the feed shaft motor 2, which leads to a further increase of the DC voltage of the DC link if such a situation is left as it is. Thus, by executing the process of step S205, energy consumed by the main spindle motor 3 is increased due to acceleration of the main spindle motor 3, which suppresses an increase of the DC voltage of the DC link.

At step S206, the feed shaft motor deceleration command for controlling the feed shaft motor inverter 12 is outputted to decelerate the feed shaft motor 2. The feed shaft motor deceleration command outputted by the numerical controller 18 is transmitted to the feed shaft motor inverter controller 12C via the communication bus 32. Upon receipt of the feed shaft motor deceleration command, the feed shaft motor inverter controller 12C performs switching operations of the switching elements inside the conversion circuit to convert to the three-phase AC power of a desired voltage and a desired frequency for decelerating the feed shaft motor 2. The feed shaft motor 2 is to be decelerated based on the supplied three-phase AC power of a variable voltage and a variable frequency.

Upon completion of processing of step S206, processing of step S201 is resumed. In other words, by repeatedly executing the processes of steps S201 to S206, the numerical controller 18 outputs the feed shaft motor deceleration command and also outputs either the main spindle motor deceleration command or the main spindle motor acceleration command according to the value of the power consumption of the main spindle motor calculated by the power calculation unit 17.

Figure 6:
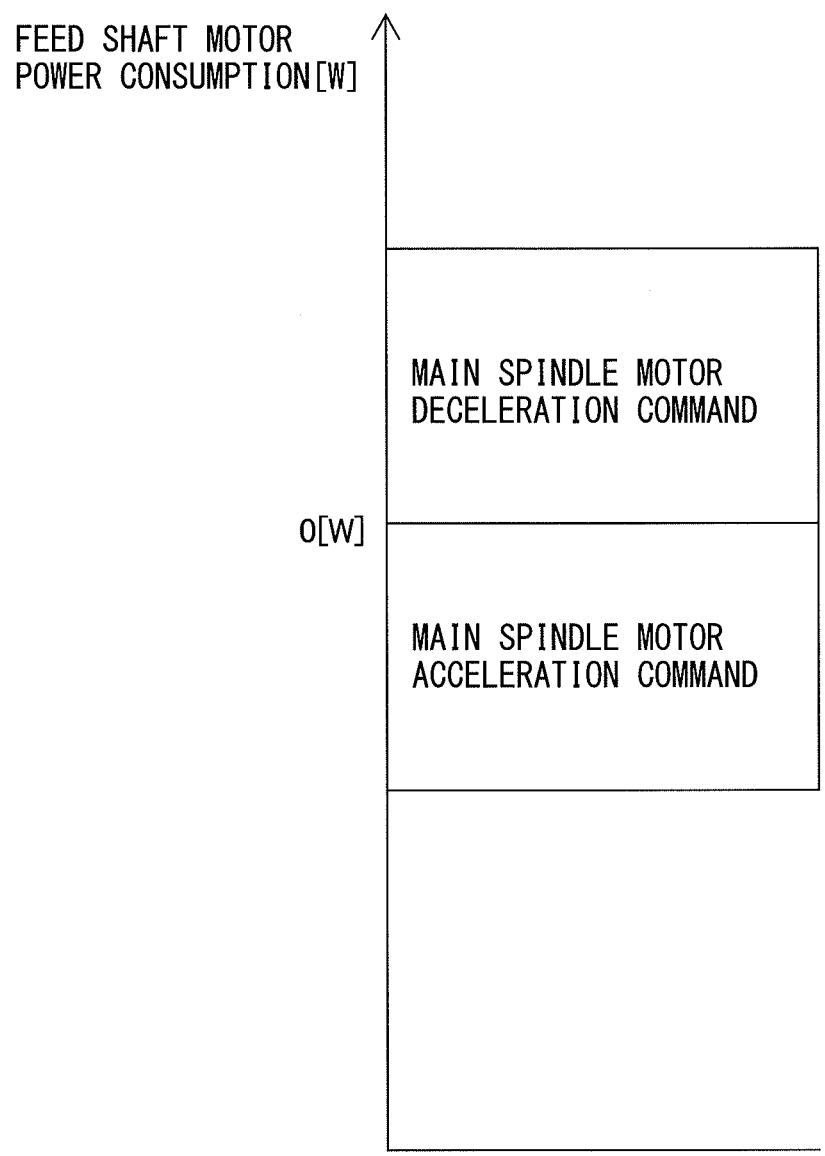
FIG. 6 is a diagram explaining a command to be notified to a main spindle motor inverter during a power outage according to the second embodiment.

FIG. 6 is a diagram explaining a command to be notified to the main spindle motor inverter during a power outage according to the second embodiment. As described above, upon an occurrence of a power outage of the AC power supply side, the numerical controller 18 transmits the feed shaft motor deceleration command to the feed shaft motor inverter 12, but the command to be transmitted to the main spindle motor inverter 13 is to be different depending on whether the power consumption of the feed shaft motor 2 calculated by the power calculation unit 17 is positive or negative. In other words, when the power consumption of the feed shaft motor 2 calculated by the power calculation unit 17 is negative, the main spindle motor acceleration command is transmitted, which causes the main spindle motor 3 to be accelerated to consume regenerative energy generated in the feed shaft motor 2 which is a cause of an increase of the DC voltage at the DC link, and hence an increase of the DC power at the DC link is suppressed and reaching the overvoltage alarm level is avoided. When the power consumption of the feed shaft motor 2 calculated by the power calculation unit 17 is positive, the main spindle motor deceleration command is transmitted, which leads to that the power consumption of the feed shaft motor 2 which is a cause of a decrease of the DC voltage at the DC link is offset with the regenerative power generated by decelerating the main spindle motor 3, and hence a decrease of the DC power at the DC link is suppressed and reaching the low voltage alarm level is avoided.

Figure 8A:
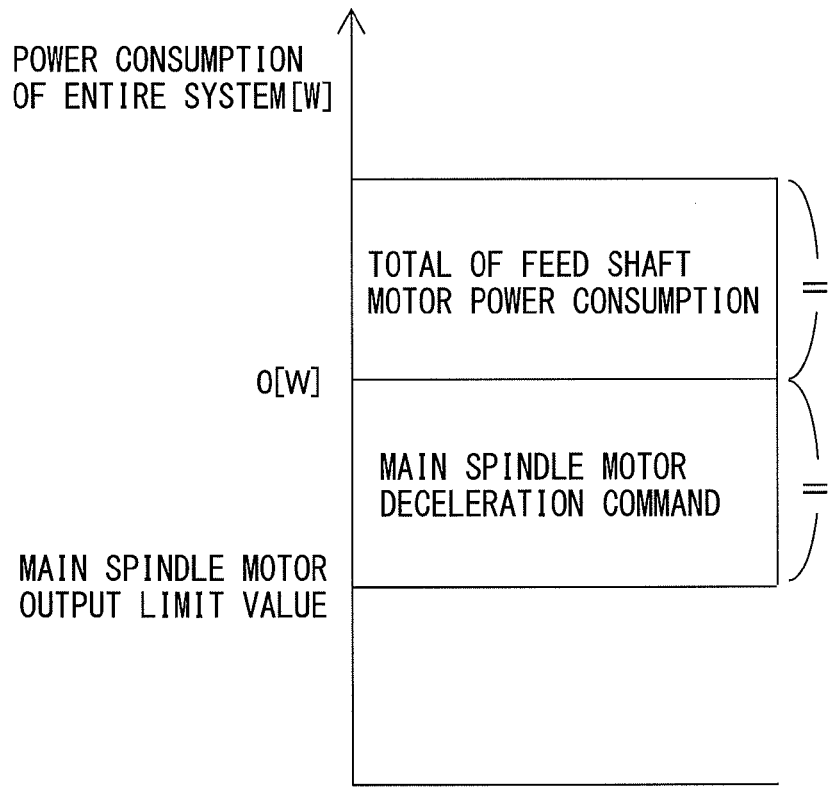
FIG. 8A and FIG. 8B are diagrams explaining a command to be notified to a main spindle motor inverter during a power outage according to a modified example of the third embodiment illustrated in FIG. 7.
Figure 8B:
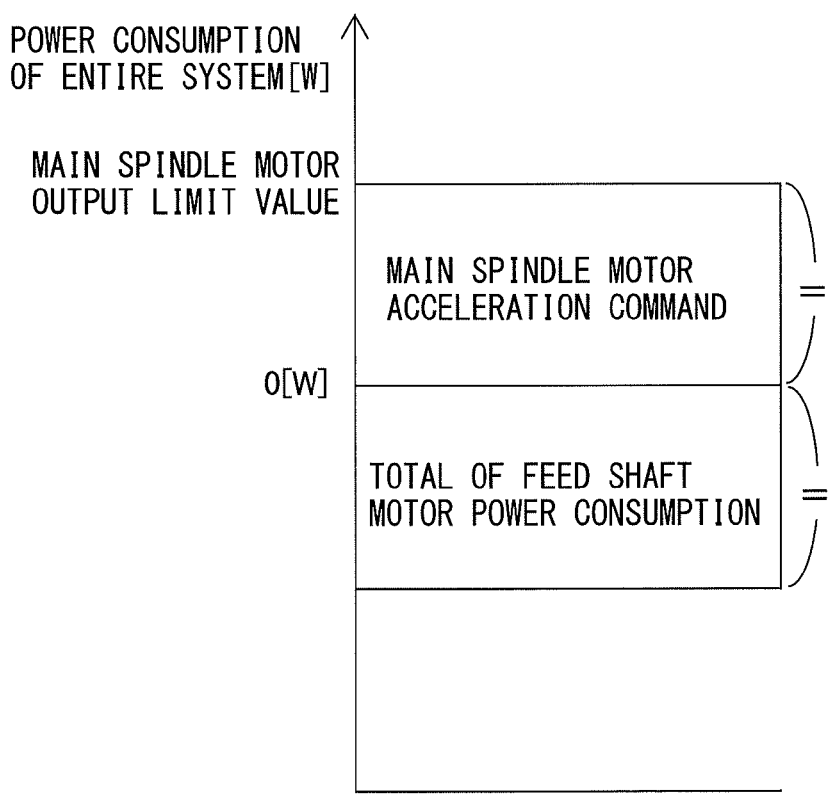

FIG. 7 is a flowchart illustrating an operational flow of a control apparatus of a machine tool according to a third embodiment. FIG. 8A and FIG. 8B are diagrams explaining a command to be notified to a main spindle motor inverter during a power outage according to a modified example of the third embodiment illustrated in FIG. 7. The third embodiment is to keep the DC voltage of the DC link constant, in the second embodiment in which FIG. 5 and FIG. 6 are referred to, by limiting the AC output of the main spindle motor inverter 13 outputted based on the main spindle motor acceleration command or the main spindle motor deceleration command according to the power consumption of the feed shaft motor 2. In other words, in the third embodiment, the numerical controller 18 outputs the power consumption calculated by the power calculation unit 17 as a main spindle motor output limit value and, in accordance with this, the main spindle motor inverter 13 performs, until the total amount of the AC power generated by the bi-directional power conversion of the main spindle motor inverter 13 based on the main spindle motor acceleration command or the main spindle motor deceleration command reaches the main spindle motor output limit value, the bi-directional power conversion between the DC voltage at the DC link and the AC voltage of the main spindle motor side based on that main spindle motor acceleration command or that main spindle motor deceleration command.

First, at step S301, the power outage detection unit 14 inside the converter 11 detects an occurrence and non-occurrence of a power outage of the AC power supply side of the converter 11. When the power outage detection unit 14 detects an occurrence of a power outage at step S301, step S302 is proceeded to.

At step S302, the power outage detection unit 14 notifies the converter controller 11C and the numerical controller 18 via the communication bus 32 of the fact that a power outage has occurred at the AC power supply side of the converter 11.

At step S303, the numerical controller 18 determines whether the power consumption of the feed shaft motor 2 calculated by the power calculation unit 17 is negative or positive. When the power consumption calculated by the power calculation unit 17 is positive, step S304 is proceeded to and when it is negative, step S305 is proceeded to.

At step S304, the numerical controller 18 creates the main spindle motor deceleration command for controlling the main spindle motor inverter 13 to decelerate the main spindle motor 3.

At step S305, the numerical controller 18 outputs the main spindle motor acceleration command for controlling the main spindle motor inverter 13 to accelerate the main spindle motor 3.

At step S306, the numerical controller 18 sets the power consumption calculated by the power calculation unit 17 as a main spindle motor output limit value. Specifically, since the fact that the power consumption calculated by the power calculation unit 17 is positive means that energy is consumed in the feed shaft motor 2, the numerical controller 18 creates the main spindle motor deceleration command to offset the energy consumed in the feed shaft motor 2 with the regenerative energy generated by decelerating the main spindle motor 3, which is the same as that described in the second embodiment illustrated in FIG. 5 and FIG. 6. Furthermore, in the third embodiment, as illustrated in FIG. 8A, the main spindle motor output limit value is set to the AC power outputted by the main spindle motor inverter 13 so that the total amount of the AC power outputted by the main spindle motor inverter 13 is equal to the amount of the power consumption in the feed shaft motor 2. When the power consumption calculated by the power calculation unit 17 is positive, the main spindle motor output limit value is set to be negative. Since the fact that the power consumption calculated by the power calculation unit 17 is negative means that energy is regenerated in the feed shaft motor 2, the numerical controller 18 makes the main spindle motor 3 to consume the energy regenerated in the feed shaft motor 2 by creating the main spindle motor acceleration command to accelerate the main spindle motor 3, which is the same as that described in the second embodiment illustrated in FIG. 5 and FIG. 6. Furthermore, in the third embodiment, as illustrated in FIG. 8B, the main spindle motor output limit value is set to the AC power outputted by the main spindle motor inverter 13 so that the total amount of the AC power outputted by the main spindle motor inverter 13 is equal to the amount of the power consumption in the feed shaft motor 2. When the power consumption calculated by the power calculation unit 17 is negative, the main spindle motor output limit value is set to be positive.

At step S307, the numerical controller 18 transmits to the main spindle motor inverter controller 13C via the communication bus 32 the main spindle motor output limit value set at step S306 and the main spindle motor deceleration command created at step S304 or the main spindle motor acceleration command created at step S305. The main spindle motor inverter controller 13C makes the switching elements inside the conversion circuit to perform switching operations until the total amount of the AC power generated by the bi-directional power conversion of the main spindle motor inverter 13 based on the main spindle motor acceleration command or the main spindle motor deceleration command reaches the main spindle motor output limit value. Thus, the main spindle motor inverter 13 makes a conversion to output the three-phase AC power of a desired voltage and a desired frequency for decelerating or accelerating the main spindle motor 3 until the total amount of the AC power generated by the bi-directional power conversion of the main spindle motor inverter 13 based on the main spindle motor acceleration command or the main spindle motor deceleration command reaches the main spindle motor output limit value.

At step S308, the feed shaft motor deceleration command for controlling the feed shaft motor inverter 12 is outputted to decelerate the feed shaft motor 2. The feed shaft motor deceleration command outputted by the numerical controller 18 is transmitted to the feed shaft motor inverter controller 12C via the communication bus 32.

Upon completion of processing of step S308, processing of step S301 is resumed. In other words, by repeatedly executing the processes of steps S301 to S308, the numerical controller 18 outputs the feed shaft motor deceleration command and outputs the main spindle motor output limit value and either the main spindle motor deceleration command or the main spindle motor acceleration command according to the value of the power consumption of the main spindle motor calculated by the power calculation unit 17.

As explained above, by setting the main spindle motor output limit value according to the power consumption calculated by the power calculation unit 17, the main spindle motor inverter 13 makes a conversion to output the three-phase AC power of a desired voltage and a desired frequency for decelerating or accelerating the main spindle motor 3 until the total amount of the AC power generated by the bi-directional power conversion of the main spindle motor inverter 13 based on the main spindle motor acceleration command or the main spindle motor deceleration command reaches the main spindle motor output limit value, and when the total amount of the AC power generated by the bi-directional power conversion of the main spindle motor inverter 13 has reached the main spindle motor output limit value, consumed or regenerated power in the entire system including the feed shaft motor 2 and the main spindle motor 3 becomes zero as illustrated in FIG. 8A and FIG. 8B, therefore it is possible to suppress the fluctuation of the DC voltage of the DC link.

Figure 9:
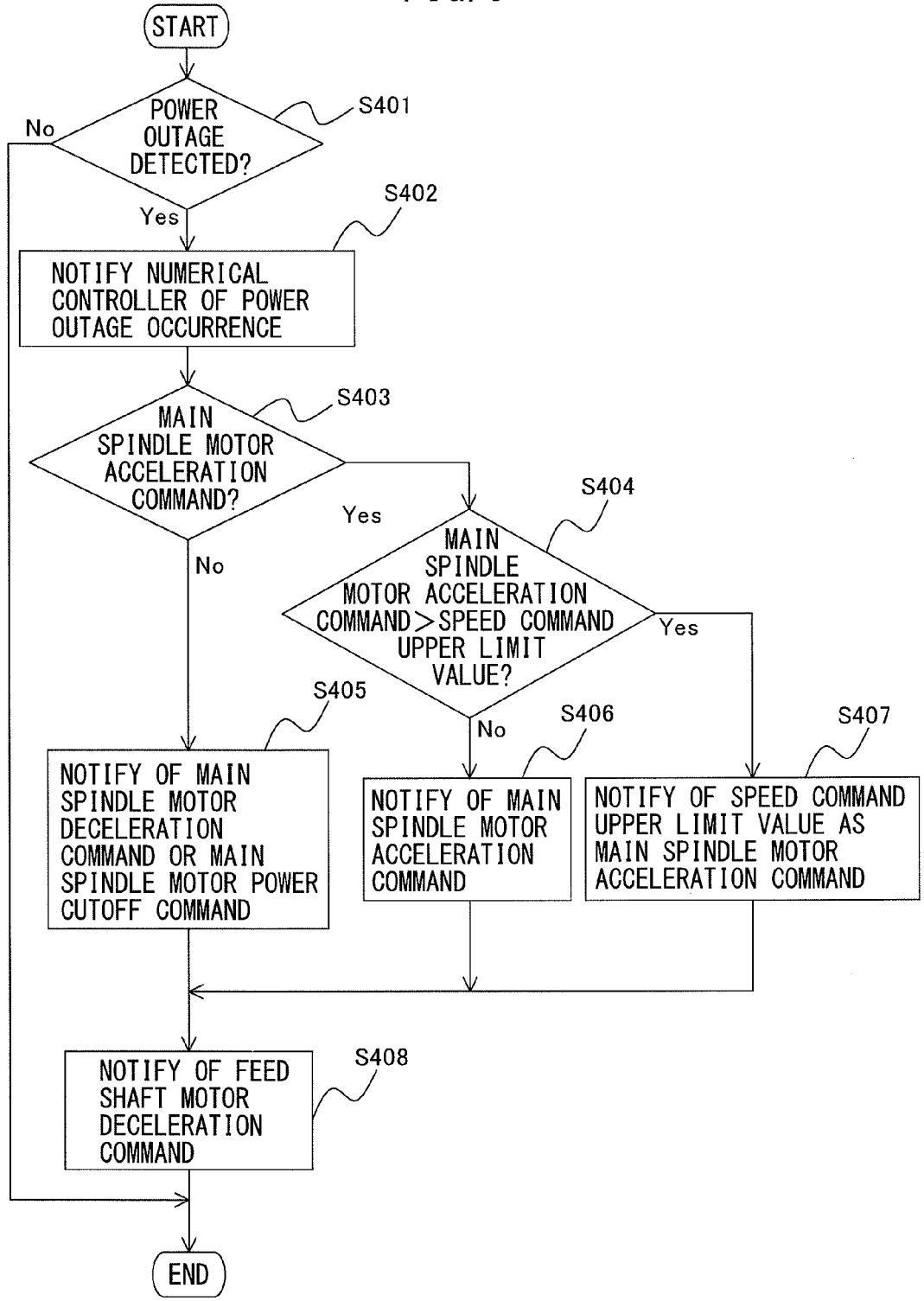
FIG. 9 is a flowchart illustrating an operational flow of a control apparatus of a machine tool according to a fourth embodiment.

FIG. 9 is a flowchart illustrating an operational flow of a control apparatus of a machine tool according to a fourth embodiment. As described above, in the first to third embodiments, when a power outage occurs at the AC power supply side of the converter 11, the numerical controllers 16 and 18 create the main spindle motor acceleration command according to a predetermined condition. Although, based on this spindle motor acceleration command, the main spindle motor inverter 13 is to output the AC power for accelerating the main spindle motor 3, since motors in general, not limited to the main spindle motor have a maximum rotational speed which is structurally allowed, it is dangerous to endlessly maintain acceleration of the main spindle motor upon an occurrence of a power outage as described above. Thereby, in the fourth embodiment, with regard to the main spindle motor acceleration command, the main spindle motor acceleration command at a time when the maximum rotational speed which is allowed for the main spindle motor is reached is set as a speed command upper limit value.

First, at step S401, the power outage detection unit 14 inside the converter 11 detects an occurrence and non-occurrence of a power outage of the AC power supply side of the converter 11. When the power outage detection unit 14 detects an occurrence of a power outage at step S401, step S402 is proceeded to.

At step S402, the power outage detection unit 14 notifies the converter controller 11C and the numerical controller 16 or 18 via the communication bus 32 of the fact that a power outage has occurred at the AC power supply side of the converter 11. Then the processes according to the first to third embodiments illustrated in FIG. 1 to FIG. 8B are executed, but in order to simplify the explanation, the explanation of a series of processes about which of the main spindle motor acceleration command, the main spindle motor deceleration command, or the main spindle motor power cutoff command the numerical controller 16 or 18 generates is omitted herein.

At step S403, the numerical controller 16 or 18 determines whether or not the main spindle motor acceleration command has been created. When the main spindle motor acceleration command has been created, step S404 is proceeded to, otherwise, step S405 is proceeded to.

When the main spindle motor acceleration command is determined to have been created at step S403, the numerical controller 16 or 18 determines whether or not the main spindle motor acceleration command is greater than a predetermined speed command upper limit value. The main spindle motor acceleration command at a time when the maximum rotational speed which is allowed for the main spindle motor is set as the speed command upper limit value and the speed command upper limit value is stored in advance in a memory inside the numerical controller 16 or 18. For example, when the maximum rotational speed of the main spindle motor 3 is 10,000 per minute, this value is set as the speed command upper limit value.

When the main spindle motor acceleration command is determined to be greater than the speed command upper limit value at step S404, the speed command upper limit value is notified to the main spindle motor inverter controller 13C via the communication bus 32 as the main spindle motor acceleration command at step S407.

When the main spindle motor acceleration command is determined to be less than or equal to the speed command upper limit value at step S404, the main spindle motor acceleration command is notified to the main spindle motor inverter controller 13C via the communication bus 32 as it is at step S406.

On the other hand, when the main spindle motor acceleration command is determined not to have been created at step S403, the numerical controller 16 or 18 notifies the main spindle motor inverter controller 13C via the communication bus 32 of the main spindle motor deceleration command or the main spindle motor power cutoff command at step S405.

At step S408, the feed shaft motor deceleration command for controlling the feed shaft motor inverter 12 is outputted to decelerate the feed shaft motor 2. The feed shaft motor deceleration command outputted by the numerical controller 16 or 18 is transmitted to the feed shaft motor inverter controller 12C via the communication bus 32.

Upon completion of processing of step S408, processing of step S401 is resumed. In other words, by repeatedly executing the processes of steps S401 to S408, the numerical controller 16 or 18 outputs the feed shaft motor deceleration command and outputs either the main spindle motor deceleration command, the main spindle motor acceleration command, or the main spindle motor power cutoff command according to a predetermined condition.

Figure 10:
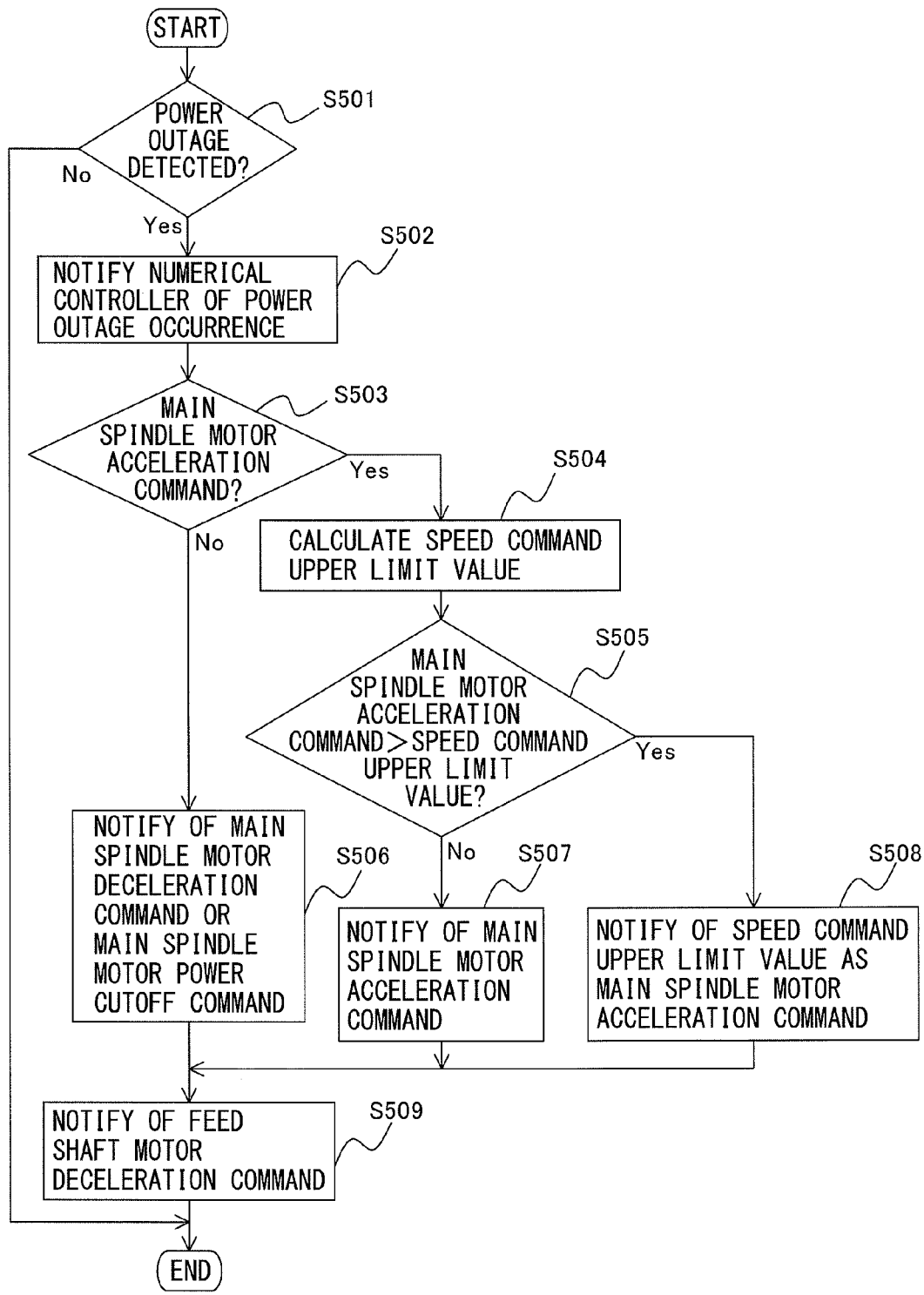
FIG. 10 is a flowchart illustrating an operational flow of a control apparatus of a machine tool according to a fifth embodiment.

FIG. 10 is a flowchart illustrating an operational flow of a control apparatus of a machine tool according to a fifth embodiment. The fifth embodiment is that, in the first to third embodiments, with a rotational speed of the main spindle motor 3 at a time when the power outage detection unit 14 detects a power outage as a reference, an increase of the main spindle motor acceleration command corresponding to a maximum allowable increase from the rotational speed is set in advance as a speed command increase allowable value, and a value obtained by adding the speed command increase allowable value to the rotational speed of the main spindle motor 3 at a time when the power outage detection unit 14 detects the power outage is set as the speed command upper limit value of the main spindle motor acceleration command. The speed command increase allowable value may be set in a form of an increase (absolute value) from the rotational speed or a ratio to the rotational speed. For example, in a case that the main spindle motors 3 have the number of rotations of 1,000 per minute and 4,000 per minute during normal operation, the main spindle motors 3 can be effectively and securely controlled by setting in a form of the speed command increase allowable value rather than by uniformly setting the speed command upper limit value as in the fourth embodiment. The speed command increase allowable values corresponding to the main spindle motor 3 to be driven are stored in advance in the memory inside the numerical controller 16 or 18.

First, at step S501, the power outage detection unit 14 inside the converter 11 detects an occurrence and non-occurrence of a power outage of the AC power supply side of the converter 11. When the power outage detection unit 14 detects an occurrence of a power outage at step S501, step S502 is proceeded to.

At step S502, the power outage detection unit 14 notifies the converter controller 11C and the numerical controller 16 or 18 via the communication bus 32 of the fact that a power outage has occurred at the AC power supply side of the converter 11. Then the processes according to the first to third embodiments illustrated in FIG. 1 to FIG. 8B are to be executed, but in order to simplify the explanation, the explanation of a series of processes about which of the main spindle motor acceleration command, the main spindle motor deceleration command, or the main spindle motor power cutoff command the numerical controller 16 or 18 generates is omitted herein.

At step S503, it is determined whether or not the numerical controller 16 or 18 has created the main spindle motor acceleration command. When the main spindle motor acceleration command has been created, step S504 is proceeded to, otherwise, step S505 is proceeded to.

At step S504, the numerical controller 16 or 18 calculates the speed command upper limit value by adding the speed command increase allowable value stored in advance in the memory inside the numerical controller 16 or 18 to the rotational speed of the main spindle motor 3 at a time when the power outage detection unit 14 detects the power outage. The rotational speed of the main spindle motor 3 at a time when the power outage detection unit 14 detects the power outage may be obtained from measured data from a rotational speed sensor mounted on the main spindle motor 3 or may be obtained through estimation at the main spindle motor inverter controller 13C based on a value of an AC current outputted from the main spindle motor inverter 13.

When the speed command upper limit value is calculated at step S504, the numerical controller 16 or 18 determines whether or not the main spindle motor acceleration command is greater than the speed command upper limit value at step S505.

When the main spindle motor acceleration command is determined to be greater than the speed command upper limit value at step S505, the speed command upper limit value is notified as the main spindle motor acceleration command to the main spindle motor inverter controller 13C via the communication bus 32 at step S508.

When the main spindle motor acceleration command is determined to be less than or equal to the speed command upper limit value at step S505, the main spindle motor acceleration command is notified as it is to the main spindle motor inverter controller 13C via the communication bus 32 at step S507.

On the other hand, when it is determined at step S503 that the main spindle motor acceleration command has not been created, the numerical controller 16 or 18 notifies the main spindle motor inverter controller 13C via the communication bus 32 of the main spindle motor deceleration command or the main spindle motor power cutoff command.

At step S509, the feed shaft motor deceleration command for controlling the feed shaft motor inverter 12 is outputted to decelerate the feed shaft motor 2. The feed shaft motor deceleration command outputted by the numerical controller 16 or 18 is transmitted to the feed shaft motor inverter controller 12C via the communication bus 32.

Upon completion of processing of step S509, processing of step S501 is resumed. In other words, by repeatedly executing the processes of steps S501 to S509, the numerical controller 16 or 18 outputs the feed shaft motor deceleration command and outputs either the main spindle motor deceleration command, the main spindle motor acceleration command, or the main spindle motor power cutoff command according to a predetermined condition.

Figure 11:
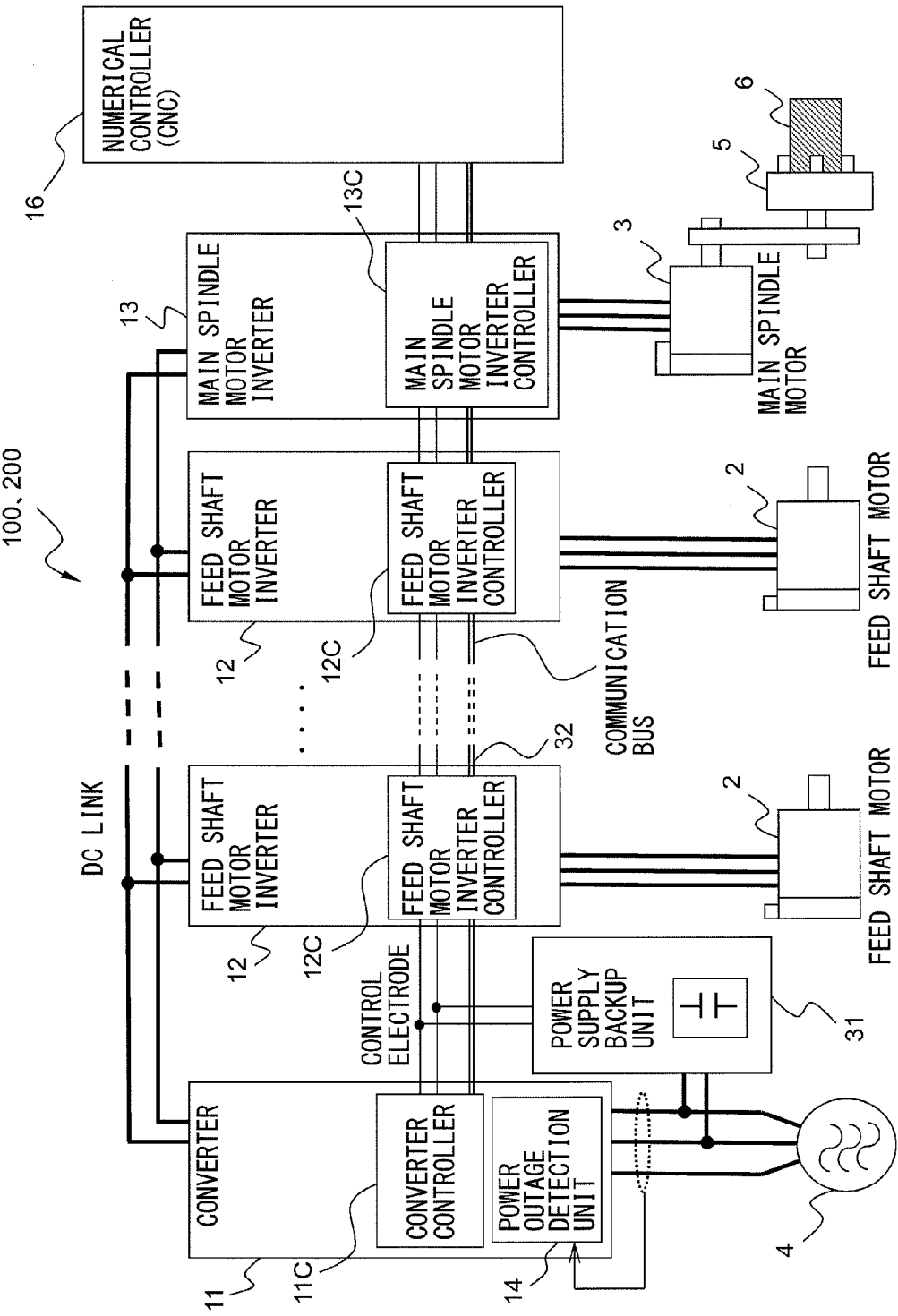
FIG. 11 is a block diagram illustrating a control apparatus of a machine tool according to a sixth embodiment.

FIG. 11 is a block diagram illustrating a control apparatus of a machine tool according to a sixth embodiment. The sixth embodiment is a case that the machine tool is particularly a lathe in the fourth and fifth embodiments described above. As illustrated in FIG. 11, when the machine tool is a lathe, a main spindle 5 being driven by the main spindle motor 3 is a shaft which holds and rotates a workpiece 6. Note that illustration of the voltage detection unit 15 and the power detection unit 17 is omitted in FIG. 11. In a case that the machine tool is a lathe, there may be a situation where the main spindle 5 is chucking (holding) the workpiece 6 when a power outage occurs at the AC power supply side of the converter 11. Since, depending on the size and inertia of the workpiece 6 held by the main spindle, the torque of the main spindle motor 3 driving the main spindle 5 varies, the maximum rotational speed allowed for the main spindle motor 3 varies depending on the type of the workpiece 6 when the main spindle motor is accelerated by the main spindle motor acceleration command. The resistance of rotational speed also varies depending on the type of the workpiece 6. In the sixth embodiment, the speed command upper limit value in the fourth embodiment and the speed increase allowable value in the fifth embodiment are changed depending on the type of the workpiece 6 held by the main spindle to effectively secure further safety.

Figure 12:
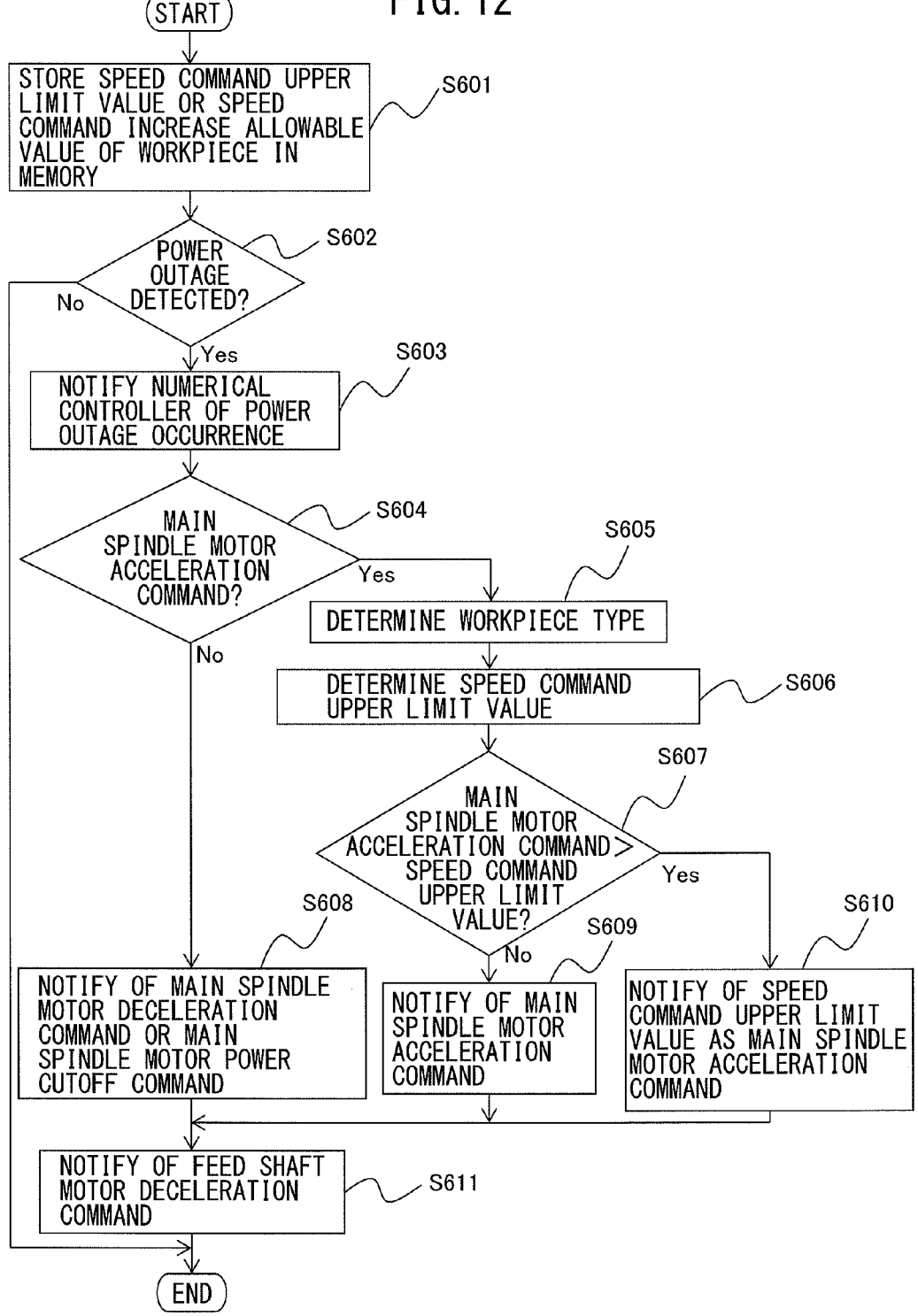
FIG. 12 is a flowchart illustrating an operational flow of a control apparatus of a machine tool according to the sixth embodiment.

FIG. 12 is a flowchart illustrating an operational flow of the control apparatus of the machine tool according to the sixth embodiment.

First, at step S601, the optimum speed command upper limit value or speed increase allowable value is set for each type of the workpiece 6 held by the main spindle 5 being driven by the main spindle motor 3 and stored in the memory (not shown) inside the numerical controller 16 or 18. For example, when the inertia of the workpiece 6 is large, the speed command upper limit value or speed increase allowable value is set rather low to secure the safety since there is a possibility that the gripping force of the chuck is exceeded by acceleration and the workpiece comes off, and when the inertia of the workpiece 6 is small, the speed command upper limit value or speed increase allowable value is set rather high to secure the suppression effect of a voltage increase of the DC link since the gripping force of the chuck has some margin.

Subsequently, at step S602, the power outage detection unit 14 inside the converter 11 detects an occurrence and non-occurrence of a power outage of the AC power supply side of the converter 11. When the power outage detection unit 14 detects an occurrence of a power outage at step S602, step S603 is proceeded to.

At step S603, the power outage detection unit 14 notifies the converter controller 11C and the numerical controller 16 or 18 via the communication bus 32 of the fact that a power outage has occurred at the AC power supply side of the converter 11. Then the processes according to the first to third embodiments illustrated in FIG. 1 to FIG. 8B are to be executed, but in order to simplify the explanation, the explanation of a series of processes about which of the main spindle motor acceleration command, the main spindle motor deceleration command, or the main spindle motor power cutoff command the numerical controller 16 or 18 generates is omitted herein.

At step S604, it is determined whether or not the numerical controller 16 or 18 has created the main spindle motor acceleration command. When the main spindle motor acceleration command has been created, step S605 is proceeded to, otherwise, step S608 is proceeded to.

At step S605, the type of the workpiece 6 being held by the main spindle 5 being driven by the main spindle motor 3 is determined.

Subsequently, at step S606, the speed command upper limit value or the speed command increase allowable value corresponding to the determined workpiece 6 is retrieved from the memory inside the numerical controller 16 or 18. In particular, when the speed command increase allowable value is retrieved, the speed command upper limit value is calculated by adding the speed command increase allowable value stored in advance in the memory inside the numerical controller 16 or 18 to the rotational speed of the main spindle motor 3 at a time when the power outage detection unit 14 detects a power outage.

At step S607, the numerical controller 16 or 18 determines whether or not the main spindle motor acceleration command is greater than the speed command upper limit value.

When the main spindle motor acceleration command is determined to be greater than the speed command upper limit value at step S607, the speed command upper limit value is notified as the main spindle motor acceleration command to the spindle motor inverter controller 13C via the communication bus 32 at step S610.

When the spindle motor acceleration command is determined to be less than or equal to the speed command upper limit value at step S607, the main spindle motor acceleration command is notified as it is to the main spindle motor inverter controller 13C via the communication bus 32 at step S609.

On the other hand, when it is determined at step S604 that the main spindle motor acceleration command has not been created, the numerical controller 16 or 18 notifies the main spindle motor inverter controller 13C via the communication bus 32 of the main spindle motor deceleration command or the main spindle motor power cutoff command at step S608.

At step S611, the feed shaft motor deceleration command for controlling the feed shaft motor inverter 12 is outputted to decelerate the feed shaft motor 2. The feed shaft motor deceleration command outputted by the numerical controller 16 or 18 is transmitted to the feed shaft motor inverter controller 12C via the communication bus 32.

Upon completion of processing of step S611, processing of step S601 is resumed. In other words, by repeatedly executing the processes of steps S601 to S611, the numerical controller 16 or 18 outputs the feed shaft motor deceleration command and outputs either the main spindle motor deceleration command, the main spindle motor acceleration command, or the main spindle motor power cutoff command according to a predetermined condition.

Figure 13:
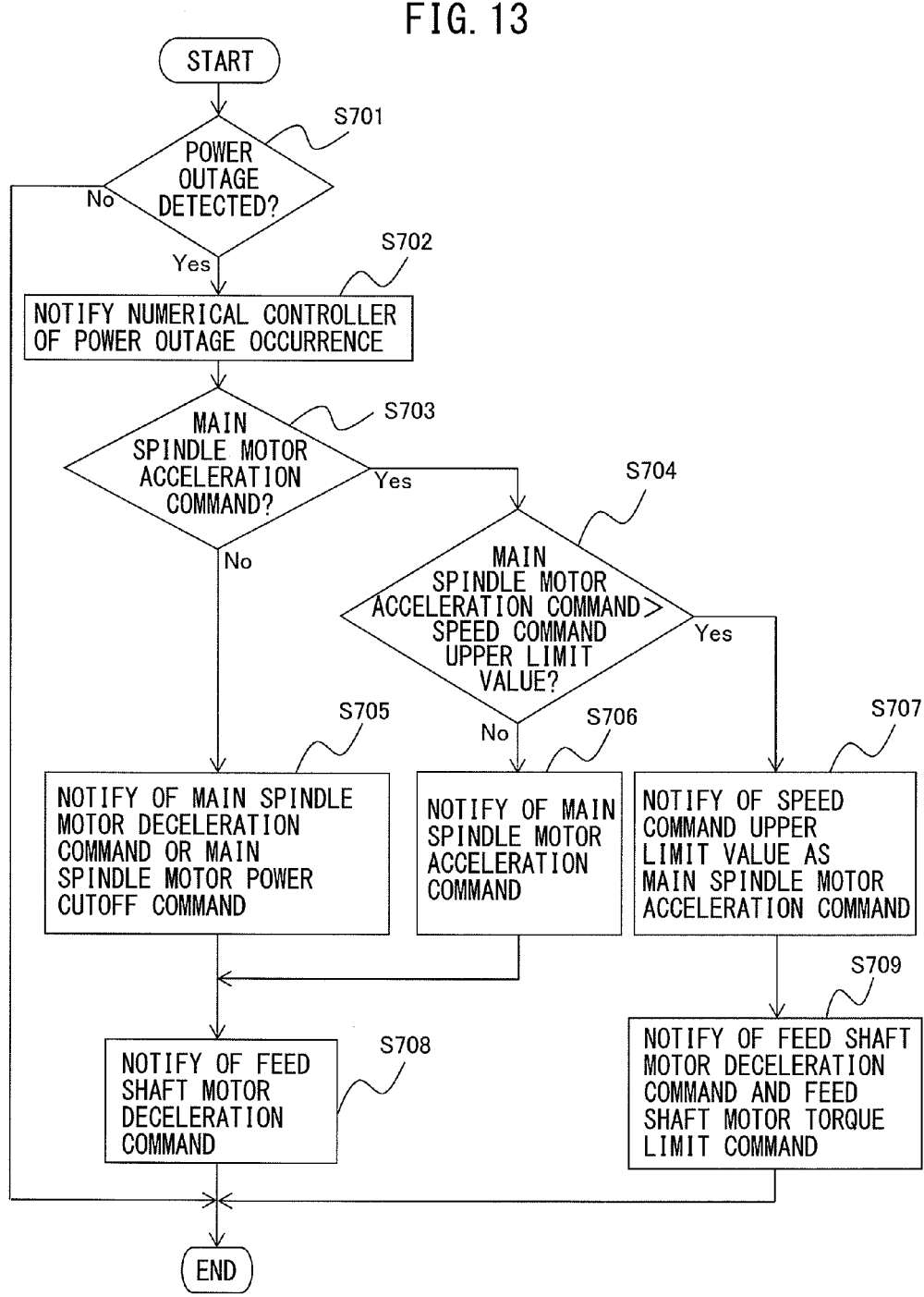
FIG. 13 is a flowchart illustrating an operational flow of the control apparatus of the machine tool according to a seventh embodiment.

FIG. 13 is a flowchart illustrating an operational flow of a control apparatus of a machine tool according to a seventh embodiment. The main spindle motor acceleration command does not exceed the speed command upper limit value in the fourth to sixth embodiments. When the main spindle motor acceleration command reaches the speed command upper limit value, there is a possibility that the DC voltage at the DC link increases since further energy is difficult to be consumed in the main spindle motor 3. The seventh embodiment is intended to deal with such a case and the numerical controller 16 or 18 is configured to output the feed shaft motor deceleration command to the feed shaft motor inverter 12 upon detection of a power outage by the power outage detection unit 14 and to output a feed shaft motor torque limit command for controlling the feed shaft motor inverter 12 to decrease torque of the feed shaft motor 2 from the current one in a case that the main spindle motor acceleration command reaches the speed command upper limit value when the main spindle motor acceleration command is outputted to the main spindle motor inverter 13, which suppresses an increase of the DC voltage of the DC link.

First, at step S701, the power outage detection unit 14 inside the converter 11 detects an occurrence and non-occurrence of a power outage of the AC power supply side of the converter 11. When the power outage detection unit 14 detects an occurrence of a power outage at step S701, step S702 is proceeded to.

At step S702, the power outage detection unit 14 notifies the converter controller 11C and the numerical controller 16 or 18 via the communication bus 32 of the fact that a power outage has occurred at the AC power supply side of the converter 11. Then the processes according to the first to third embodiments illustrated in FIG. 1 to FIG. 8B are to be executed, but in order to simplify the explanation, the explanation of a series of processes about which of the main spindle motor acceleration command, the main spindle motor deceleration command, or the main spindle motor power cutoff command the numerical controller 16 or 18 generates is omitted herein.

At step S703, it is determined whether or not the numerical controller 16 or 18 has created the main spindle motor acceleration command. When the main spindle motor acceleration command has been created, step S704 is proceeded to, otherwise, step S705 is proceeded to.

At step S704, the numerical controller 16 or 18 determines whether or not the main spindle motor acceleration command is greater than the speed command upper limit value. The speed command upper limit value is obtained by retrieving it in a case that it is stored in advance in the memory inside the numerical controller 16 or 18 as the main spindle motor acceleration command at a time when the maximum rotational speed or the maximum number of rotations allowed for the main spindle motor is reached, or is calculated by adding the speed command increase allowable value obtained by retrieving it, which is stored in the memory inside the numerical controller 16 or 18, to the rotational speed of the main spindle motor 3 at a time when the power outage detection unit 14 detects a power outage.

When the main spindle motor acceleration command is determined to be greater than the speed command upper limit value at step S704, the speed command upper limit value is notified as the main spindle motor acceleration command to the main spindle motor inverter controller 13C via communication bus 32 at step S707.

Subsequently, at step S709, a feed shaft motor torque limit command for controlling the feed shaft motor inverter 12 to decrease torque of the feed shaft motor 2 from the current one is created. This feed shaft motor torque limit command is transmitted together with the feed shaft motor deceleration command to the feed shaft motor inverter controller 12C via the communication bus 32.

When the main spindle motor acceleration command is determined to be less than or equal to the speed command upper limit value at step S704, the main spindle motor acceleration command is notified as it is to the main spindle motor inverter controller 13C via the communication bus 32 at step S706, then step S708 is proceeded to.

On the other hand, when it is determined at step S703 that the main spindle motor acceleration command has not been created, the numerical controller 16 or 18 notifies the main spindle motor inverter controller 13C via the communication bus 32 of the main spindle motor deceleration command or the main spindle motor power cutoff command at step S705.

At step S708, the feed shaft motor deceleration command for controlling the feed shaft motor inverter 12 is outputted to decelerate the feed shaft motor 2. The feed shaft motor deceleration command outputted by the numerical controller 16 or 18 is transmitted to the feed shaft motor inverter controller 12C via the communication bus 32.

Upon completion of processing of step S708 or S709, processing of step S701 is resumed. In other words, by repeatedly executing the processes of steps S701 to S709, the numerical controller 16 or 18 outputs the feed shaft motor deceleration command, outputs either the main spindle motor deceleration command, the main spindle motor acceleration command, or the main spindle motor power cutoff command according to a predetermined condition, and also outputs the feed shaft motor torque limit command according to a predetermined condition.

Figure 14:
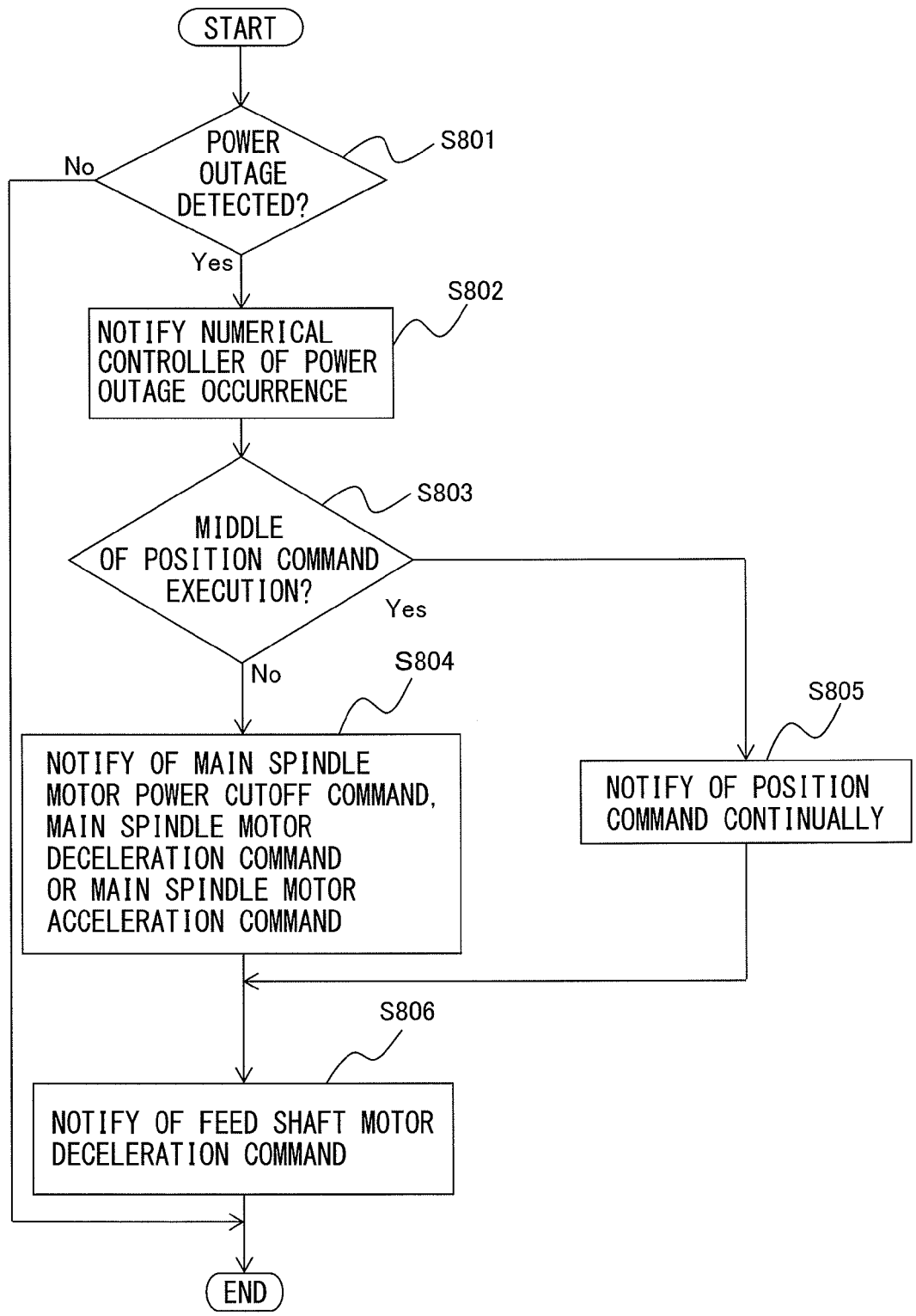
FIG. 14 is a flowchart illustrating an operational flow of a control apparatus of a machine tool according to an eighth embodiment.

FIG. 14 is a flowchart illustrating an operational flow of a control apparatus of a machine tool according to an eighth embodiment. A control for accelerating a main spindle based on the main spindle motor acceleration command in the first to seventh embodiments assumes a rotation control for a purpose of cutting in general, but when a position control is being performing by a main spindle, there is a possibility that a contour control by interpolation in concert with a feed shaft or other main spindle is being performed, in this situation, if acceleration or deceleration based on the first to seventh embodiments is performed, it may become impossible to maintain the synchronicity of the interpolation, which may damage a workpiece or a tool. The eighth embodiment is intended to deal with such a case and the numerical controller 16 or 18 is configured not to output the main spindle motor acceleration command or the main spindle motor deceleration command to the main spindle motor inverter 13 when the position control of the main spindle is being performed upon detection of a power outage by the power outage detection unit 14.

First, at step S801, the power outage detection unit 14 inside the converter 11 detects an occurrence and non-occurrence of a power outage of the AC power supply side of the converter 11. When the power outage detection unit 14 detects an occurrence of a power outage at step S801, step S802 is proceeded to.

At step S802, the power outage detection unit 14 notifies the converter controller 11C and the numerical controller 16 or 18 via the communication bus 32 of the fact that a power outage has occurred at the AC power supply side of the converter 11.

At step S803, the numerical controller 16 or 18 determines whether or not the position control of the main spindle is being performed. When the position control of the main spindle is being performed, step S805 is proceeded to and when the position control of the main spindle is not being performed, step S804 is proceeded to.

When it is determined that the position control of the main spindle is being performed at step S803, the main spindle motor acceleration command or the main spindle motor deceleration command is not outputted to the main spindle motor inverter 13 and a position command is continually notified to the main spindle motor inverter 13 via the communication bus 32 at step S805.

When it is determined that the position control of the main spindle is not being performed at step S803, the processes of the first to seventh embodiments as described above are executed at step S804 to notify the main spindle motor inverter 13 via the communication bus 32 of either the main spindle motor deceleration command, the main spindle motor acceleration command, or the main spindle motor power cut-off command according to a predetermined condition.

The present invention may be applied to a control apparatus of a machine tool including a feed shaft motor for driving a feed shaft and a main spindle motor for driving a main spindle, in which AC supplied from an AC power supply side is converted to output DC which is again converted to AC for driving the motors, which is supplied to drive the feed shaft motor and the main spindle motor.

According to the present invention, in a machine tool including a feed shaft motor for driving a feed shaft and a main spindle motor for driving a main spindle, the feed shaft motor can be reliably and early halted upon an occurrence of a power outage at an AC power supply side, therefore a collision of the feed shaft upon an occurrence of a power outage at the AC power supply side can be avoided.

According to the first embodiment, upon an occurrence of a power outage at an AC power supply side, a numerical controller transmits a feed shaft motor deceleration command to a feed shaft motor inverter and transmits a main spindle motor acceleration command when a DC voltage at a DC link detected by a voltage detection unit is greater than a predetermined upper limit value, which causes a main spindle motor to be accelerated to consume an increase of a DC power at the DC link which is a cause of an increase of the DC voltage at the DC link, and hence an increase of the DC power at the DC link can be suppressed and reaching an overvoltage alarm level can be avoided. When the DC voltage at the DC link detected by the voltage detection unit is less than a predetermined lower limit value, a main spindle motor deceleration command is transmitted, which leads to that a decrease of the DC power at the DC link which is a cause of a decrease of the DC voltage at the DC link is offset with regenerative power generated by decelerating the main spindle motor, and hence a decrease of the DC power at the DC link can be suppressed and reaching a low voltage alarm level can be avoided.

According to the second embodiment, upon an occurrence of a power outage at an AC power supply side, a numerical controller transmits a feed shaft motor deceleration command to a feed shaft motor inverter and, when a power consumption of a feed shaft motor calculated by a power calculation unit is negative, transmits a main spindle motor acceleration command, which causes a main spindle motor to be accelerated to consume regenerative energy generated in the feed shaft motor which is a cause of an increase of a DC voltage at a DC link, and hence an increase of DC power at the DC link can be suppressed and reaching an overvoltage alarm level can be avoided. In addition, when a power consumption of the feed shaft motor calculated by the power calculation unit is positive, a main spindle motor deceleration command is transmitted, which leads to that a power consumption in the feed shaft motor which is a cause of a decrease of the DC voltage at the DC link is offset with regenerative power generated by decelerating the main spindle motor, and hence a decrease of the DC power at the DC link can be suppressed and reaching a low voltage alarm level can be avoided.

Furthermore, according to the third embodiment, in the first and second embodiments, by further setting a main spindle motor output limit value according to power consumption calculated by the power calculation unit, the main spindle motor inverter makes a conversion to output three-phase AC power of a desired voltage and a desired frequency for decelerating or accelerating the main spindle motor until the total amount of the AC power generated by the bi-direction power conversion of the main spindle motor inverter based on the main spindle motor acceleration command or the main spindle motor deceleration command reaches a main spindle motor output limit value, which leads to that consumed or regenerated power in an entire system including the feed shaft motor and the main spindle motor becomes zero, therefore fluctuations of the DC voltage of the DC link can be suppressed.

Furthermore, according to the fourth embodiment, further in the first to third embodiments, with regard to the main spindle motor acceleration command, since the main spindle motor acceleration command, at a time when a maximum rotational speed which is allowed for the main spindle motor is reached, is set as a speed command upper limit value, the main spindle motor will not be rotated beyond the maximum rotational speed by the main spindle motor acceleration command and therefore the safety thereof is enhanced.

Furthermore, according to the fifth embodiment, with the rotational speed of the main spindle motor at a time when the power outage detection unit detects a power outage as a reference, an increase of the main spindle motor acceleration command corresponding to a maximum allowable increase from that rotational speed is set in advance as a speed command increase allowable value, and the value obtained by adding the speed command increase allowable value to the rotational speed of the main spindle motor at a time when the power outage detection unit detects the power outage is set as a speed command upper limit value of the main spindle motor acceleration command, which leads to that the main spindle motor can be more effectively and safely controlled and the increase of the DC voltage of the DC link can be suppressed.

Furthermore, according to the sixth embodiment, when the machine tool is a lathe, additional safety can be effectively secured by changing the speed command upper limit value or the speed increase allowable value according to the type of the workpiece.

Furthermore, according to the seventh embodiment, when the feed shaft motor deceleration command is outputted to the feed shaft motor inverter and the main spindle motor acceleration command is outputted to the main spindle motor inverter upon detection of a power outage by the power outage detection unit, a feed shaft motor torque limit command for controlling the feed shaft motor inverter is outputted to decrease torque of the feed shaft motor from the current one in a case that the main spindle motor acceleration command reaches the speed command upper limit value, which can suppress an increase of the DC voltage of the DC link.

Furthermore, according to the eighth embodiment, upon detection of a power outage by the power outage detection unit, the main spindle motor acceleration command or the main spindle motor deceleration command is configured not to be outputted to the main spindle motor inverter when a position control of the main spindle is being performed, which leads to that the position control is continued and the synchronicity between the main spindle and a shaft performing an interpolation operation is not impaired, therefore problems such as serious damages to the workpiece and the tool do not occur.

The invention claimed is:

1. A control apparatus of a machine tool including a feed shaft motor for driving a feed shaft and a main spindle motor for driving a main spindle, the control apparatus comprising:
a converter for performing a bi-directional power conversion between an AC voltage of an AC power supply side and a DC voltage at a DC link being a DC side;
a feed shaft motor inverter for performing a bi-directional power conversion between the DC voltage at the DC link and an AC voltage of the feed shaft motor side to supply drive power to the feed shaft motor;
a main spindle motor inverter for performing a bi-directional power conversion between the DC voltage at the DC link and an AC voltage of the main spindle motor side to supply drive power to the main spindle motor;
a power outage detection unit for detecting an occurrence and non-occurrence of a power outage of the AC power supply side of the converter;
a voltage detection unit for detecting the DC voltage at the DC link; and
a control unit for outputting a feed shaft motor deceleration command for controlling the feed shaft motor inverter to decelerate the feed shaft motor upon detection of a power outage by the power outage detection unit, wherein, upon detection of the power outage by the power outage detection unit, the control unit outputs a main spindle motor acceleration command for controlling the main spindle motor inverter to accelerate the main spindle motor when a DC voltage detected by the voltage detection unit is greater than a predetermined upper limit value and a main spindle motor deceleration command for controlling the main spindle motor inverter to decelerate the main spindle motor when the DC voltage detected by the voltage detection unit is less than a predetermined lower limit value which is lower than the predetermined upper limit value.

2. The control apparatus according to claim 1, wherein, upon detection of the power outage by the power outage detection unit, the control unit outputs a main spindle motor power cutoff command for controlling the main spindle motor inverter to halt a supply of drive power to the main spindle motor when the DC voltage detected by the voltage detection unit is greater than or equal to the predetermined lower limit value and is less than or equal to the predetermined upper limit value.

3. The control apparatus according to claim 1, wherein the main spindle motor acceleration command includes, as a speed command upper limit value, the main spindle motor acceleration command at a time when a maximum rotational speed or a maximum number of rotations allowed for the main spindle motor is reached.

4. The control apparatus according to claim 3, wherein,
a main spindle for being driven by the main spindle motor is a shaft which holds to rotate a workpiece, and
the speed command upper limit value is set according to a type of the workpiece being held by the main spindle.

5. The control apparatus according to claim 3, wherein, when the feed shaft motor deceleration command is outputted to the feed shaft motor inverter and the main spindle motor acceleration command is outputted to the main spindle motor inverter upon detection of the power outage by the power outage detection unit, the control unit outputs a feed shaft motor torque limit command for controlling the feed shaft motor inverter to decrease torque of the feed shaft motor from a current one when the main spindle motor acceleration command reaches the speed command upper limit value.

6. The control apparatus according to claim 1, wherein,
with a rotational speed of the main spindle motor at a time when the power outage detection unit detects the power outage as a reference, an increase of the main spindle motor acceleration command corresponding to a maximum allowable increase from the rotational speed is set as a speed command increase allowable value, and
the main spindle motor acceleration command includes, as a speed command upper limit value, a value obtained by adding the speed command increase allowable value to the rotational speed of the main spindle motor at a time when the power outage detection unit detects the power outage.

7. The control apparatus according to claim 6, wherein,
a main spindle being driven by the main spindle motor is a shaft which holds to rotate a workpiece and
the speed command increase allowable value is set according to a type of the workpiece being held by the main spindle.

8. The control apparatus according to claim 1, wherein, upon detection of the power outage by the power outage detection unit, the control unit does not output the main spindle motor acceleration command or the main spindle motor deceleration command to the main spindle motor inverter when a position control of the main spindle is being performed.

9. A control apparatus of a machine tool including a feed shaft motor for driving a feed shaft and a main spindle motor for driving a main spindle, the control apparatus comprising:
a converter for performing a bi-directional power conversion between an AC voltage of an AC power supply side and a DC voltage at a DC link being a DC side;
a feed shaft motor inverter for performing a bi-directional power conversion between the DC voltage at the DC link and an AC voltage of the feed shaft motor side to supply drive power to the feed shaft motor;
a main spindle motor inverter for performing a bi-directional power conversion between the DC voltage at the DC link and an AC voltage of the main spindle motor side to supply drive power to the main spindle motor;
a power outage detection unit for detecting an occurrence and non-occurrence of a power outage of the AC power supply side of the converter;
a power calculation unit for calculating a power consumption in the feed shaft motor; and
a control unit for outputting a feed shaft motor deceleration command for controlling the feed shaft motor inverter to decelerate the feed shaft motor upon detection of the power outage by the power outage detection unit, wherein, upon detection of the power outage by the power outage detection unit, the control unit outputs a main spindle motor acceleration command for controlling the main spindle motor inverter to accelerate the main spindle motor when the power consumption calculated by the power calculation unit is negative and a main spindle motor deceleration command for controlling the main spindle motor inverter to decelerate the main spindle motor when the power consumption calculated by the power calculation unit is positive.

10. The control apparatus according to claim 9, wherein,
the control unit outputs, as a main spindle motor output limit value, the power consumption calculated by the power calculation unit, and
the main spindle motor inverter performs the bi-directional power conversion between the DC voltage at the DC link and the AC voltage of the main spindle motor side based on the main spindle motor acceleration command or the main spindle motor deceleration command until a total amount of AC power generated by the bi-direction power conversion of the main spindle motor inverter based on the main spindle motor acceleration command or the main spindle motor deceleration command reaches the main spindle motor output limit value.

11. The control apparatus according to claim 9, wherein,
the feed shaft motor inverter is provided at least for each feed shaft motor, and
the power consumption being calculated by the power calculation unit is obtained by summing power consumption in all feed shaft motors.

12. The control apparatus according to claim 9, wherein the main spindle motor acceleration command includes, as a speed command upper limit value, the main spindle motor acceleration command at a time when a maximum rotational speed or a maximum number of rotations allowed for the main spindle motor is reached.

13. The control apparatus according to claim 9, wherein,
with a rotational speed of the main spindle motor at a time when the power outage detection unit detects the power outage as a reference, an increase of the main spindle motor acceleration command corresponding to a maximum allowable increase from the rotational speed is set as a speed command increase allowable value, and
the main spindle motor acceleration command includes, as a speed command upper limit value, a value obtained by adding the speed command increase allowable value to the rotational speed of the main spindle motor at a time when the power outage detection unit detects the power outage.

14. The control apparatus according to claim 9, wherein, upon detection of the power outage by the power outage detection unit, the control unit does not output the main spindle motor acceleration command or the main spindle motor deceleration command to the main spindle motor inverter when a position control of the main spindle is being performed.

* * * * *